United States Patent
Sugita et al.

(10) Patent No.: US 7,441,616 B2
(45) Date of Patent: Oct. 28, 2008

(54) GENERATED POWER CONTROL SYSTEM

(75) Inventors: Hidehiko Sugita, Zama (JP); Hideki Kawashima, Sagamihara (JP); Toshirou Matsuda, Sagamihara (JP); Yasuki Ishikawa, Suginami-ku (JP)

(73) Assignee: Nissan Motor Co., Ltd., Yokohama (JP)

( * ) Notice: Subject to any disclaimer, the term of this patent is extended or adjusted under 35 U.S.C. 154(b) by 228 days.

(21) Appl. No.: 11/293,309

(22) Filed: Dec. 5, 2005

(65) Prior Publication Data

US 2006/0138995 A1 Jun. 29, 2006

(30) Foreign Application Priority Data

Dec. 27, 2004 (JP) ............................. 2004-376551
Dec. 28, 2004 (JP) ............................. 2004-379594

(51) Int. Cl.
*B60W 20/00* (2006.01)
(52) U.S. Cl. ..................... 180/65.2; 180/65.3; 318/811; 903/942
(58) Field of Classification Search ................ 180/65.3, 180/65.2, 65.4, 65.8; 318/811; 903/942
See application file for complete search history.

(56) References Cited

U.S. PATENT DOCUMENTS

| | | | | |
|---|---|---|---|---|
| 5,814,967 A * | 9/1998 | Garces et al. ............... | 318/807 |
| 6,060,860 A * | 5/2000 | Itoh et al. .................... | 318/809 |
| 6,166,514 A * | 12/2000 | Ando et al. .................. | 318/811 |
| 6,281,656 B1 * | 8/2001 | Masaki et al. ............... | 318/700 |
| 6,388,416 B1 * | 5/2002 | Nakatani et al. ............ | 318/700 |
| 6,456,030 B1 * | 9/2002 | Masaki et al. ............... | 318/700 |
| 6,591,925 B2 * | 7/2003 | Raftari et al. ............... | 180/65.3 |
| 6,617,820 B2 * | 9/2003 | Carlson et al. .............. | 318/727 |
| 6,622,804 B2 * | 9/2003 | Schmitz et al. ............. | 180/65.2 |
| 6,693,407 B2 * | 2/2004 | Atmur ......................... | 318/811 |
| 6,720,792 B2 * | 4/2004 | Raftari et al. ............... | 324/772 |
| 6,815,934 B2 * | 11/2004 | Colley ......................... | 322/47 |
| 6,933,699 B2 * | 8/2005 | Hsu et al. .................... | 318/635 |
| 6,936,995 B2 * | 8/2005 | Kapsokavathis et al. .... | 320/132 |
| 6,984,957 B2 * | 1/2006 | Tajima et al. ........... | 318/400.02 |
| 7,017,542 B2 * | 3/2006 | Wilton et al. ............. | 123/179.3 |
| 7,049,770 B2 * | 5/2006 | Inagaki et al. .......... | 318/400.27 |
| 7,049,783 B2 * | 5/2006 | Yoshinaga et al. .......... | 318/629 |
| 7,105,938 B2 * | 9/2006 | Edelson ..................... | 290/40 A |
| 7,121,234 B2 * | 10/2006 | Schmitz et al. ........... | 123/41.02 |

(Continued)

FOREIGN PATENT DOCUMENTS

JP 2001-239852 A 9/2001

*Primary Examiner*—Jeffrey J Restifo
(74) *Attorney, Agent, or Firm*—Global IP Counselors, LLP

(57) ABSTRACT

A generated power control system in which the magnetic field of a generator is controlled based on a target generated power so as to perform the appropriate generation control. Preferably, the generated power control system is used in a hybrid vehicle having a generator configured to be driven by an internal combustion engine that drives a first wheel and an AC motor that drives a second wheel not driven by the internal combustion engine with an inverter arranged to supply generated power from the generator to the AC motor. Basically, the generated power control basically calculates an AC motor power requirement of the AC motor and a target generated power to be generated by the generator based on the AC motor power requirement, and then controls the generated power generated by the generator by controlling a magnetic field of the generator based on the target generated power calculated.

26 Claims, 15 Drawing Sheets

U.S. PATENT DOCUMENTS 7,122,979 B2 * 10/2006 Wilton et al. .......... 318/400.09
7,176,658 B2 * 2/2007 Quazi et al. ................... 322/24
7,259,530 B2 * 8/2007 Ochiai et al. ................. 318/105
7,265,455 B2 * 9/2007 Oyobe et al. ................ 290/1 R

* cited by examiner

GENERATED POWER CONTROL SYSTEM

CROSS-REFERENCE TO RELATED APPLICATIONS

This application claims priority under 35 U.S.C. § 119 to Japanese Patent Application Nos. 2004-376551 and 2004-379594. The entire disclosures of Japanese Patent Application Nos. 2004-376551 and 2004-379594 are hereby incorporated herein by reference.

BACKGROUND OF THE INVENTION

1. Field of the Invention

The present invention generally relates to a generated power control system for controlling a generator. More specifically, the present invention relates to a generated power control system that controls generated power of a generator in a 4WD vehicle in which the generator is driven by an internal combustion engine for driving primary drive wheels, and an AC motor is driven by the generator for driving secondary drive wheels.

2. Background Information

Various generated power control systems are known in which power is supplied to the motor after the voltage command value required by a generator is calculated based on a motor torque command value, and feedback control is performed so that the output voltage value of the generator becomes this voltage command value (see, for example, Japanese Laid-Open Patent Application 2001-239852). In this publication, the generated power control system is part of a vehicle drive control system having an internal combustion engine for driving primary drive wheels, and a DC motor is driven by the generator for driving secondary drive wheels. The field current of this DC motor is controlled so as to control the drive torque to meet the vehicle drive power requirement.

In view of the above, it will be apparent to those skilled in the art from this disclosure that there exists a need for an improved a generated power control system. This invention addresses this need in the art as well as other needs, which will become apparent to those skilled in the art from this disclosure.

SUMMARY OF THE INVENTION

It has been discovered that in the above-mentioned conventional generated power control system, power generation control is merely performed by subjecting the. deviation between the voltage command value and the output voltage value to feedback control, and the generated voltage and the generated current cannot both be controlled. Consequently, there is the possibility that the required power corresponding to the demands of the motor cannot be supplied, so an unresolved problem is that there is the possibility of being unable to output the proper amount of torque.

Moreover, with the above-mentioned conventional generated power control systems, since motor torque is controlled by using a DC motor, the armature current of the DC motor has to be increased in order to raise the torque, but because there is a limit to the brush life of a DC motor, there is also a limit to how much armature current can be increased, so unresolved problems are that such a system is difficult to apply to vehicles of heavy mass, and 4WD performance cannot be improved.

It is conceivable that motor torque could be controlled by employing an AC motor and an inverter in place of a DC motor, but a battery or other such stabilizing power supply would be necessary in this case. When such a stabilizing power supply is employed with an electrical 4WD system, a special battery capable of generating output voltage of at least 50V, for example, is required, so the problem with this approach is higher cost and difficulty installation.

In view of these issues, the present invention was conceived in light of the unresolved problems associated with the above-mentioned prior art. One object of the present invention is to provide a generated power control system in which the magnetic field of a generator is controlled based on a target generated power so as to perform the appropriate generation control. Another object of the present invention to provide a generated power control system in which motor torque can be controlled by a combination of a generator and an AC motor.

In order to achieve the above object and other objects of the present invention, a generated power control system is provided for a hybrid vehicle having a generator configured to be driven by an internal combustion engine that drives a first wheel, and an AC motor that drives a second wheel not driven by the internal combustion engine with an inverter arranged to supply generated power from the generator to the AC motor. The generated power control basically comprises a motor power calculation section, a target generated power calculation section and a magnetic field control section. The motor power calculation section is configured to calculate an AC motor power requirement of the AC motor. The target generated power calculation section is configured to calculate a target generated power to be generated by the generator based on the AC motor power requirement calculated by the motor power calculation section. The magnetic field control section is configured to control the generated power generated by the generator by controlling a magnetic field of the generator based on the target generated power calculated by the target generated power calculation section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
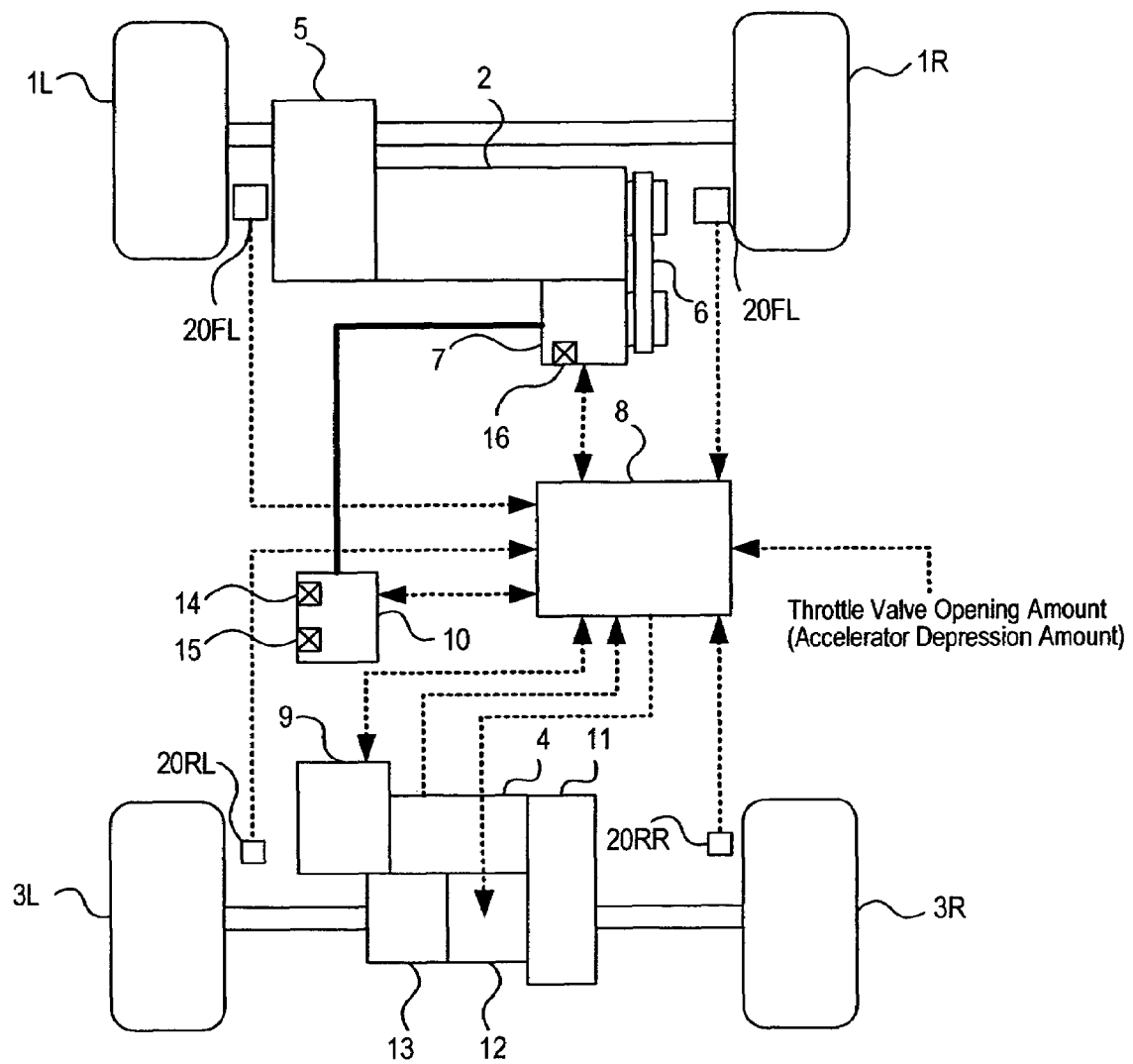
FIG. 1 is a simplified schematic block diagram of a four-wheel-drive vehicle equipped with a vehicle drive control apparatus having a generator power control unit that is configured to carryout the various embodiments of the present invention.

FIG. 1 is a simplified schematic block diagram of a four-wheel-drive vehicle equipped with a vehicle drive control apparatus with a generator power control unit in accordance with the present invention. This schematic block diagram will be used to explain each of the embodiments of the present invention. In view of the similarity between the various embodiments of the present invention, the parts of the second embodiment that are identical or have the same function will be given the same reference numerals in each of the embodiments.

Referring initially to FIG. 1, the four-wheel-drive vehicle that is used for each of the embodiments will now be explained. As shown in FIG. 1, the vehicle in this embodiment is such that the left and right front wheels 1L and 1R are the primary drive wheels driven by an engine 2 (internal combustion engine), and the left and right rear wheels 3L and 3R are secondary drive wheels that can be driven by a motor 4.

A main throttle valve and a sub-throttle valve, for example, are provided at some point along the intake passageway of the engine 2. The main throttle valve adjusts and controls the throttle opening according to how far the accelerator pedal has been depressed and so forth. The sub-throttle valve is actuated by a step motor or the like, and adjusts and controls the opening by the rotational angle according to the number of steps of this motor. Therefore, the output torque of the engine 2 can be reduced independently of the driver's operation of the accelerator pedal by adjusting the throttle opening of the sub-throttle valve to be less than or equal to the opening of the main throttle valve. In other words, adjustment of the opening of the sub-throttle valve becomes drive force control that suppresses acceleration slip at the front wheels 1L and 1R caused by the engine 2.

The output torque Te of the engine 2 is transmitted to the left and right front wheels 1L and 1R through a transmission and a differential gear 5. Part of the output torque Te of the engine 2 is transmitted through an endless belt 6 to a generator 7, causing the generator 7 to rotate at a speed Ng corresponding to the speed Ne of the engine 2 multiplied by the pulley ratio.

The generator 7 becomes a load on the engine 2 according to a field current Ifg adjusted by a 4WD controller 8, and generates power according to this load torque. The amount of power generated by the generator 7 is determined by the speed Ng and the field current Ifg. The speed Ng of the generator 7 can be calculated from the speed Ne of the engine 2 based on the pulley ratio.

The power generated by the generator 7 can be supplied through a junction box 10 and an inverter 9 to the motor 4. The drive shaft of the motor 4 can be connected to the rear wheels 3L and 3R via a reduction gear 11 and a clutch 12. The motor 4 in this embodiment is an AC motor. A differential gear 13 is a provided between the clutch 12 and the rear wheels 3L and 3R.

The clutch 12 is a wet, multi-plate clutch, for example, and is engaged and disengaged according to commands from the 4WD controller 8. In this embodiment, the clutch used for engagement is a wet, multi-plate clutch, but can instead be a powder clutch or a pump clutch, for example.

A generator voltage sensor 14 is provided inside the junction box 10 for sensing the generated voltage Vdc. Also a generator current sensor 15 is provided inside the junction box 10 for sensing the generated current Idc (the input current of the inverter 9). A resolver is linked to the drive shaft of the motor 4, and a signal θ indicating the magnetic pole position of the motor 4 is outputted. Also a relay is provided inside the junction box 10 for connecting or isolating the inverter 9 and the generator 7. When this relay is in a connected state, DC power supplied from the generator 7 through a rectifier (not shown) is converted in the inverter 9 into three-phase alternating current, which is used to drive the motor 4. A field current sensor 16 is provided for sensing the actual generator field current Ifg. The sensor signals from the sensors 14, 15 and 16 are outputted to the 4WD controller 8.

The wheels 1L, 1R, 3L, and 3R are provided with wheel speed sensors 20FL, 20FR, 20RL, and 20RR, respectively. The wheel speed sensors 20FL, 20FR, 20RL, and 20RR output pulse signals corresponding to the rotational speed of the respective wheels 1L, 1R, 3L, and 3R, to the 4WD controller 8 as sensed vehicle speed values.

The 4WD controller 8 comprises, for example, a calculation processor such as a microcomputer, and receives inputs such as vehicle speed signals sensed by the wheel speed sensors 20FL, 20FR, 20RL, and 20RR, output signals from the voltage sensor and current sensor inside the junction box 10, output signals from the resolver linked to the motor 4, the throttle valve opening corresponding to the amount of accelerator pedal (not shown) depression, and so forth.

Figure 2:
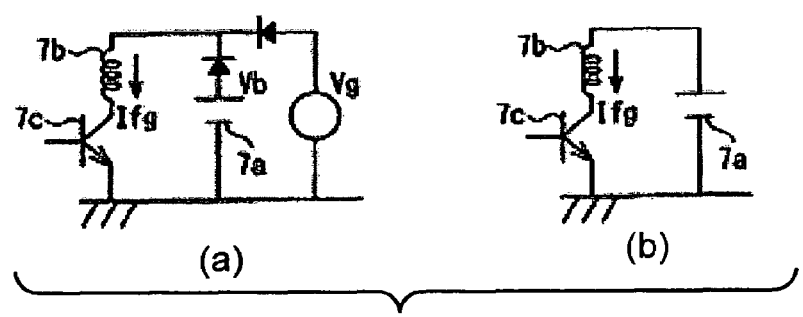
FIG. 2 is a pair of circuit diagrams illustrating two examples of the arrangement of the generator used in the four-wheel-drive vehicle of FIG. 1 to carryout the various embodiments of the present invention.

Referring now to FIG. 2, two circuit diagrams are presented schematically illustrating the structure of the field current drive circuit of the generator 7. As shown in diagram A of FIG. 2, this circuit is constituted so that the field current power supply is selected from either a constant voltage power supply such as a 14V vehicle battery 7a, or the output voltage of the generator 7 itself. The positive side of the field current power supply is connected to a field coil 7b, and a transistor 7c is switched. In this case, when the generator output voltage Vg is below the battery voltage Vb, the generator 7 is in a separately excited region, and the battery voltage Vb becomes the power supply of the field coil 7b. However, when the generator voltage Vg increases over the battery voltage Vb, the generator 7 is in a self-excitation region, and the output voltage Vg of the generator 7 is selected. Thus, this output voltage Vg of the generator 7 becomes the power supply of the field coil 7b, when the generator voltage Vg increases over the battery voltage Vb. Specifically, since the field current value can be increased by the power supply voltage of the generator 7, a large increase in generator output is possible.

Alternatively, as shown in diagram b of FIG. 2, the field current drive circuit can be configured such that just the 14V vehicle battery 7a (just the separately excited region) is used as the field current power supply.

Figure 3:
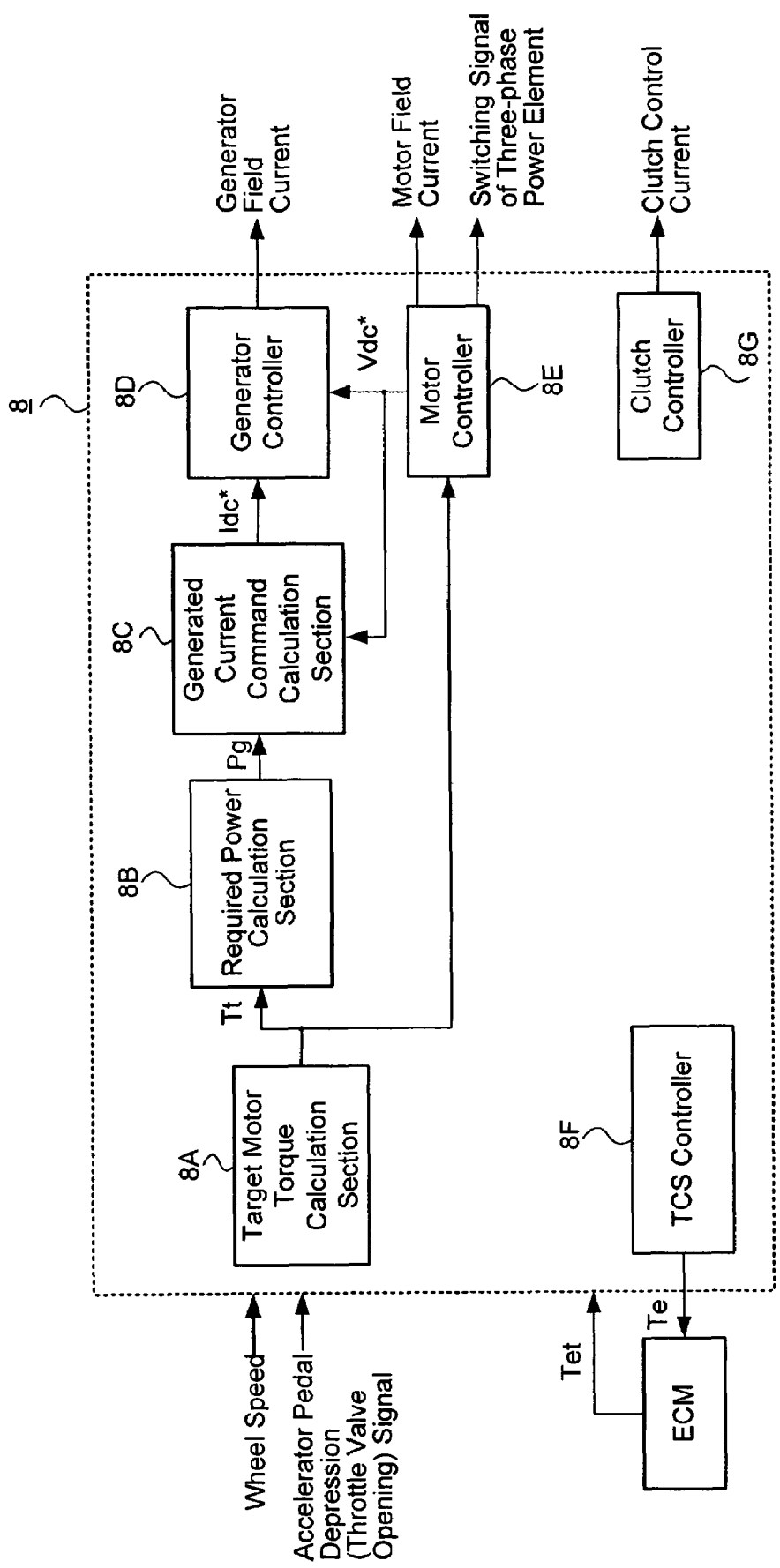
FIG. 3 is a block diagram illustrating one possible configuration of the 4WD controller of FIG. 1 in accordance with a first embodiment of the present invention.
Figure 4:
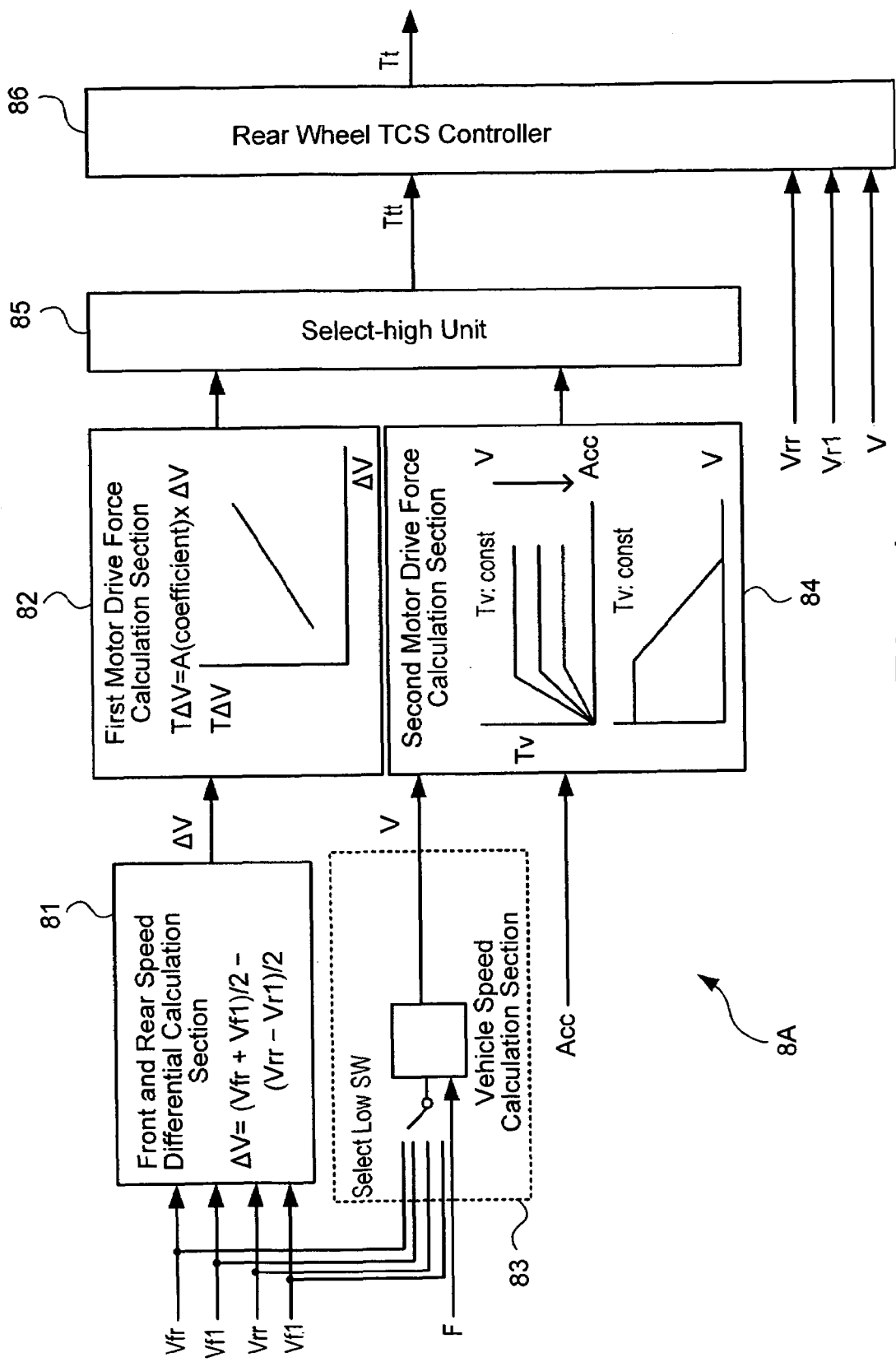
FIG. 4 is a block diagram illustrating one possible configuration of the target motor torque calculation section in FIG. 7 in accordance with the first embodiment of the present invention.

As shown in FIG. 3, the 4WD controller 8 in accordance with a first embodiment comprises a target motor torque calculation section 8A, a power calculation section 8B (serving as a motor power calculation section), a generated current command calculation section 8C (serving as a target generated current calculation section), a generator controller 8D (serving as a magnetic field control section), a motor controller 8E, a TCS controller 8F, and a clutch controller 8G. With this embodiment of the present invention, the generated current and generated voltage can both be made to conform to command values by controlling the magnetic field of the generator 7 and varying the load of the inverter 9, so power corresponding to the demands of the motor 4 can be supplied more efficiently, and suitable generation control can be performed to allow the required torque to be outputted.

The target motor torque calculation section 8A is configured to calculate a motor torque command value Tt from the accelerator pedal depression signal (throttle valve opening signal) Acc and the wheel speed differential between the front and rear wheels calculated based on the wheel speed signals for the four wheels.

Figure 8:
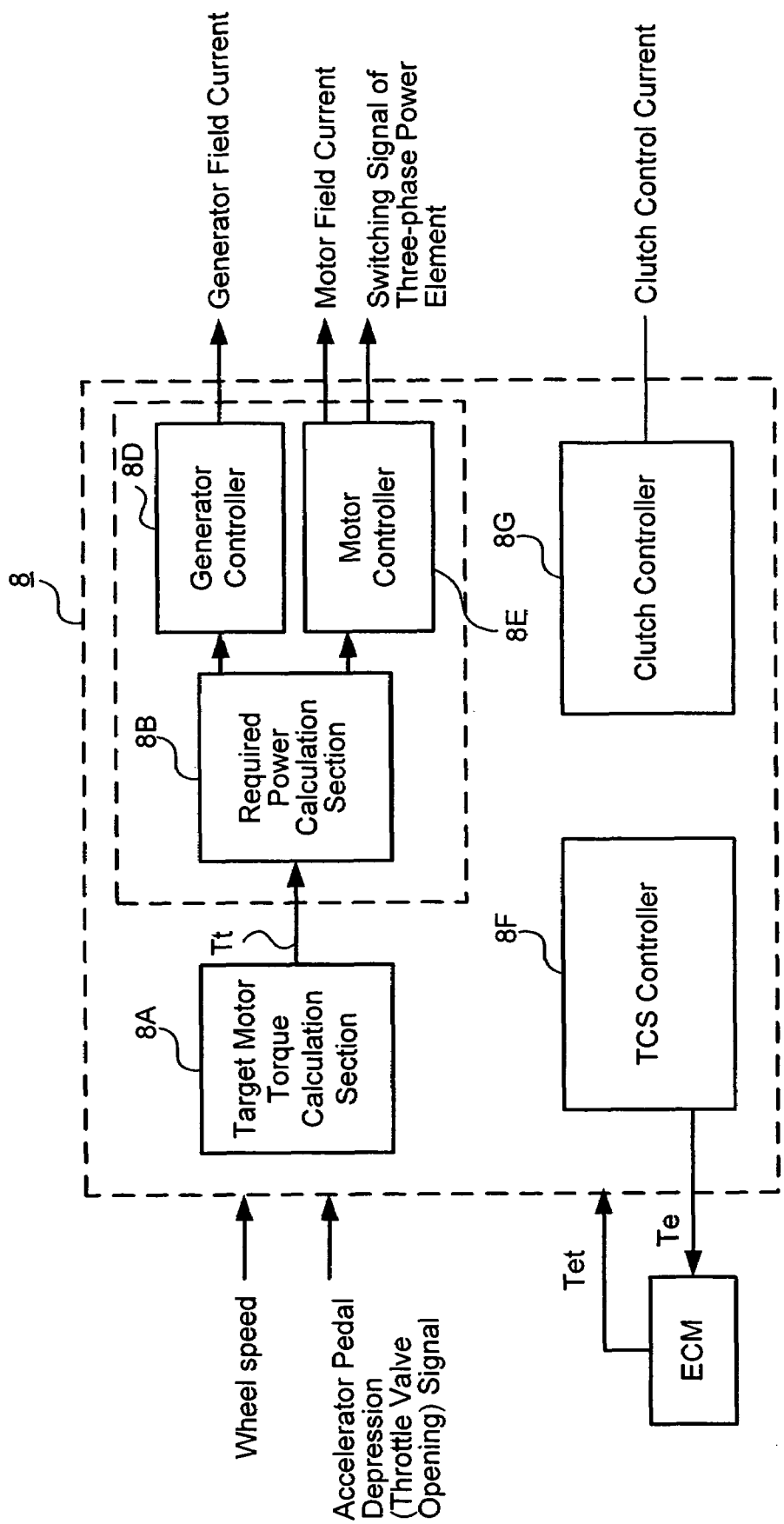
FIG. 8 is a block diagram illustrating one possible configuration of the 4WD controller of FIG. 1 in accordance with a second embodiment of the present invention.
Figure 9:
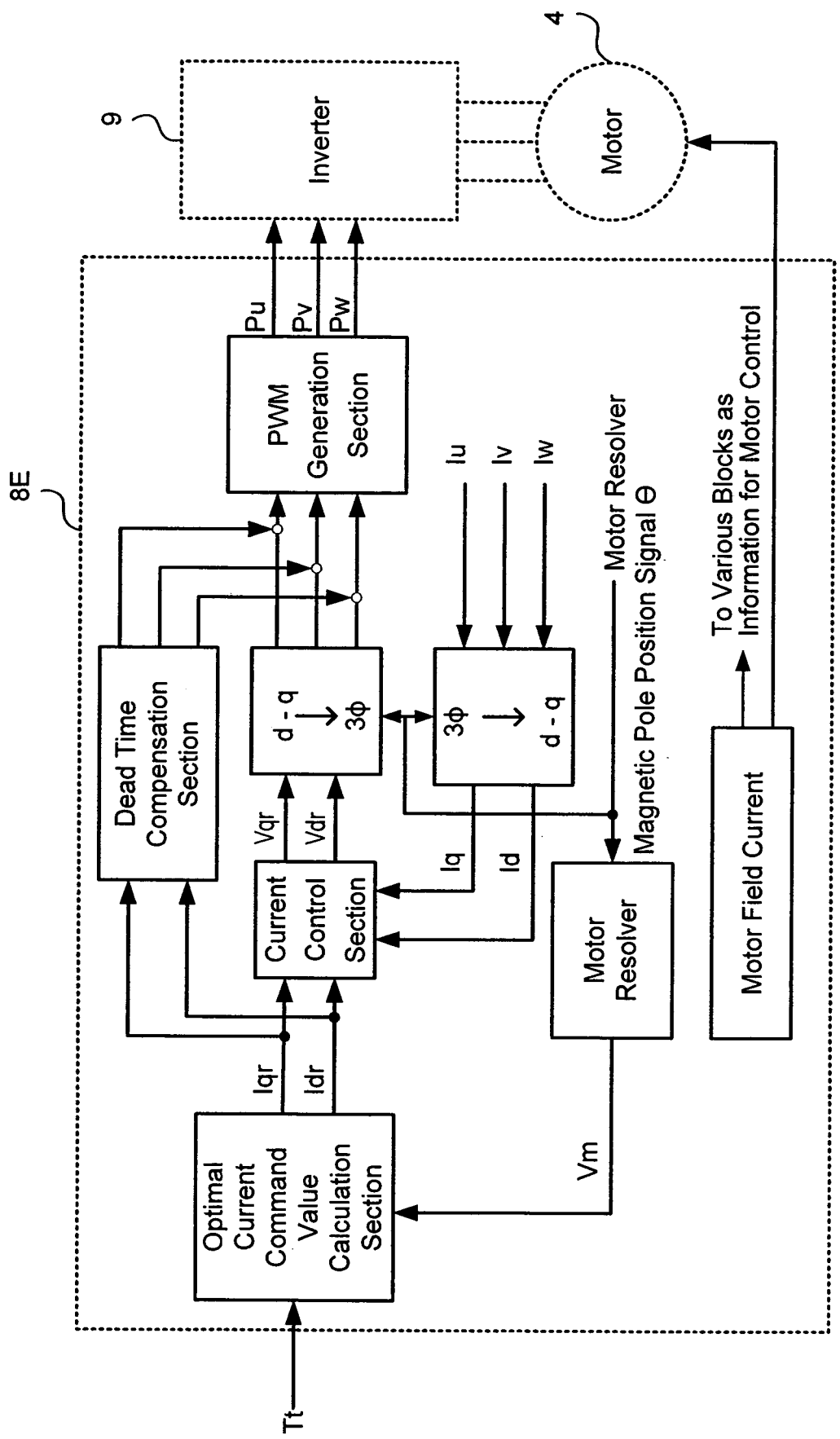
FIG. 9 is a block diagram illustrating one possible configuration of the motor controller in FIG. 8 in accordance with the second embodiment of the present invention.

FIG. 8 is a block diagram illustrating the details of the target motor torque calculation section 8A. First, a front and rear speed differential calculation section 81 is configured to calculate a front and rear speed differential ΔV from the following Equation (1) based on the wheel speed signals $V_{FR}$ to $V_{RR}$ for the four wheels.

$$\Delta V = (V_{FR} + V_{FL})/2 - (V_{RR} - V_{RL})/2 \qquad (1)$$

A first motor drive force calculation section 82 is configured to calculate a first motor drive force TΔV by referring to a pre-stored map based on the front and rear speed differential ΔV, and outputs this result to a select-high unit (discussed below). This first motor drive force TΔV is set so as to be calculated proportionately larger as the front and rear speed differential ΔV increases.

A vehicle speed calculation section 83 is configured to calculate a vehicle speed signal V, with the wheel speed signals for the four wheels and the total drive force F generated by the vehicle in select-low mode. The total drive force F here is found as the sum of the front wheel drive force estimated from the torque converter slip ratio and the rear wheel drive force estimated from the torque command value Tt.

A second motor drive force calculation section 84 is configured to calculate a second motor drive force Tv. More specifically, this is calculated through reference to a pre-stored map based on the accelerator pedal depression amount or the throttle valve opening amount Acc and the vehicle speed V outputted from the vehicle speed calculation section 83. This second motor drive force Tv is set such that it increases in proportion to the accelerator pedal depression amount or the throttle valve opening amount Acc, and decreases in inverse proportion to the vehicle speed V.

Next, a select-high unit 85 is configured to output the first motor drive force TΔV outputted from the first motor drive force calculation section 82, and the second motor drive force Tv outputted from the second motor drive force calculation section 84, both in select-high mode, as the target torque Ttt to a rear wheel TCS controller 86.

Rear wheel traction control is then performed by a known method based on the rear wheel speeds $V_{RL}$ and $V_{RR}$ and the vehicle speed V, and the final torque command value Tt of the motor 4 is outputted.

The power calculation section 8B is configured to calculate a generator required power Pg from the following Equation (2) based on the torque command value Tt and the motor speed Nm.

$$Pg = Tt \times Nm / \eta m \qquad (2)$$

Here, the term ηm is the inverter efficiency. Specifically, the generator required power Pg is a value that is greater by the inverter efficiency ηm than the power Pm(=Tt×Nm) required by the motor 4 and found from the product of multiplying the torque command value Tt by the motor speed Nm.

The generated current command calculation section 8C is configured to calculate a generated current command value or target current Idc* from the following Equation (3) based on a generated voltage command value or target voltage Vdc* calculated by the motor controller 8E (discussed below).

$$Idc^* = Pg/Vdc^* \quad (3)$$

The TCS controller 8F is configured to perform front wheel traction control by sending an engine generated drive torque demand signal Tet back to an engine torque controller (ECM) by a known method based on the engine generated drive torque demand signal Tet received from the engine torque controller (ECM), the rotational speeds $V_{FR}$ and $V_{FL}$ of the right and left front wheels, and the vehicle speed V. Thus, the 4WD controller 8 and the engine torque controller (ECM) cooperate together so as to serve a vehicle drive force calculation section that is configured to calculate a drive force required by the hybrid vehicle.

The clutch controller 8G is configured to control an engagement state of the clutch 12, such that the clutch 12 is placed in a connected state whenever the clutch controller 8G determines that a four-wheel-drive state is desired and/or needed.

Figure 5:
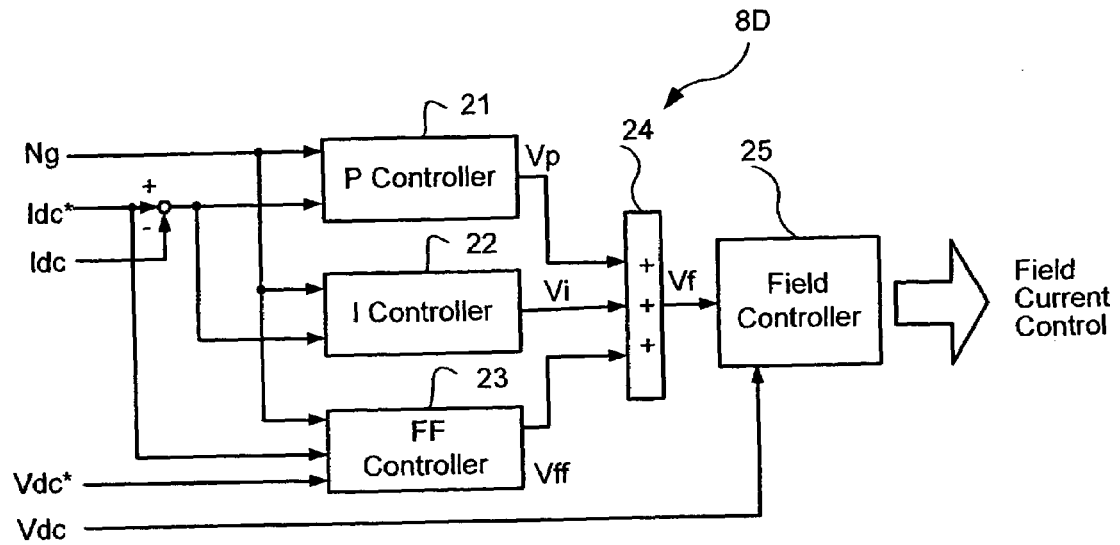
FIG. 5 is a block diagram illustrating one possible configuration of a generator controller in accordance with the first embodiment of the present invention.

FIG. 5 is a block diagram illustrating the details of the generator controller 8D that controls the power generated by the generator 7. The generator controller 8D basically comprises a P controller 21, an I controller 22, a feed-forward controller 23, a control amount adder 24, and a field controller 25. The generator controller 8D is configured to control the field current Ifg of the generator 7 using PWM control by determining the field voltage PWM duty ratio C1.

The P controller 21 is configured to perform P control based on the deviation between an actual generated current value Idc and the generated current command value Idc* calculated from Equation (2) above. First, the deviation between the generated current command value Idc* and the actual generated current value Idc is multiplied by a specific gain. To keep the gain sensitivity constant with respect to the rotational speed fluctuation of the generator 7, this product is multiplied by the inverse of the generator speed Ng, and this product is outputted to the control amount adder 24 (discussed below) as a control amount Vp in P control.

The I controller 22 is configured to perform I control based on the deviation between the actual generated current value Idc and the generated current command value Idc* calculated from Equation (3) above. That is, the I controller 22 integrates the deviation between the generated current command value Idc* and the actual generated current value Idc. The integrated value are used as upper and lower limits. Just as in the P control above, this integrated value is multiplied by the inverse of the generator speed Ng, and this product is outputted to the control amount adder 24 (discussed below) as a control amount Vi in the I control.

The feed-forward controller 23 refers to a generator characteristic map for each of various speeds that have been pre-stored, and finds the PWM duty ratio D1 of the generator field voltage by feed-forward based on the generated voltage command value Vdc* and the generated current command value Idc*. The feed-forward controller 23 then calculates a control amount Vff in the feed-forward control from the following Equation (4) based on the PWM duty ratio D1 and the generated voltage command value Vdc*.

$$Vff = D1 \times Vdc^* \quad (4)$$

The control amount adder 24 adds the control amount Vp, the control amount Vi, and the control amount Vff, and outputs this sum to the field controller 25 as the voltage Vf to be applied to the magnetic coil.

The field controller 25 is configured to determine whether or not the actual generated voltage value Vdc is less than or equal to the battery (serving as the field current power supply) voltage Vb (12V). If this state (Vdc≦Vb) exists, then the field voltage PWM duty ratio C1 is calculated from the following Equation (5).

$$C1 = Vf/Vb \quad (5)$$

However, if the actual generated voltage value Vdc is greater than the battery voltage Vb (i.e., Vdc>Vb), then the field voltage PWM duty ratio C1 is calculated from the following Equation (6).

$$C1 = Vf/Vdc \quad (6)$$

The field current Ifg of the generator 7 is controlled according to the duty ratio C1 calculated as above. That is, the generator controller 8D is configured to make the actual generated voltage value Vdc conform to the generated voltage command value Vdc* by specifying by feed-forward controlling the generator operating point at which is exhibited the generator required power Pg determined from the torque command value Tt, and subjecting the generated voltage command value Vdc* and the actual generated voltage value Vdc to feedback controlling with PI compensation.

Here, the PI compensation is employed as the control method used for feedback control, but the present invention is not limited to this, and any control method that stabilizes the system can be used.

Thus, the generator 7 outputs the generated voltage command value Vdc* and the generated current command value Idc* such that the motor 4 to output torque that will match the torque command value Tt. The generated voltage command value Vdc* and generated current command value Idc* are the voltage and current at which the generator 7 will supply the generator required power Pg most efficiently. Put another way, the generator required power Pg can be outputted efficiently as long as the generated voltage command value Vdc* and generated current command value Idc* are both satisfied.

Figure 6:
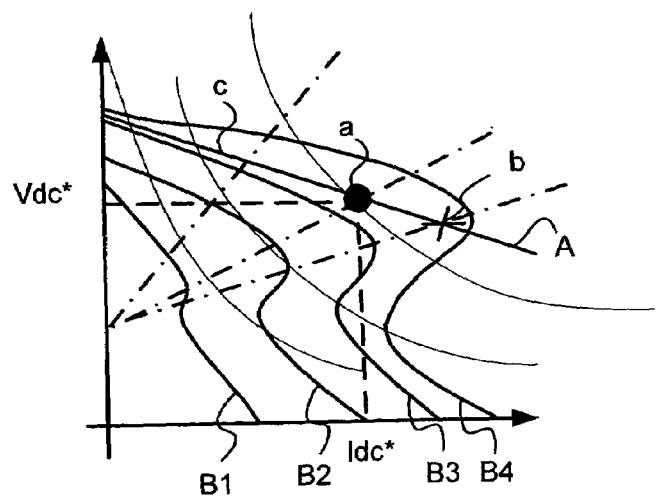
FIG. 6 is a graph of the characteristics of a generator in accordance with the present invention.

FIG. 6 is a graph of the characteristics of the generator 7, in which the horizontal axis is generated current and the vertical axis is generated voltage. In FIG. 6, the straight line A is an If line at which the output of the generator 7 can be taken off by inverter load (impedance) when the field current Ifg of the generator 7 is constant. That is, the operating point which the generator 7 can achieve moves along an If line. For example, when the impedance is low, the voltage will be low and the current will be high, as indicated by point b, at a given field current Ifg. Conversely, when the impedance is high, the voltage will be high and the current will be low, as indicated by point c, at a given field current Ifg. Accordingly, the impedance load is preferably adjusted to satisfy both the generated voltage command value Vdc* and the generated current command value Idc* to achieve the most efficient operating point a.

Figure 7:
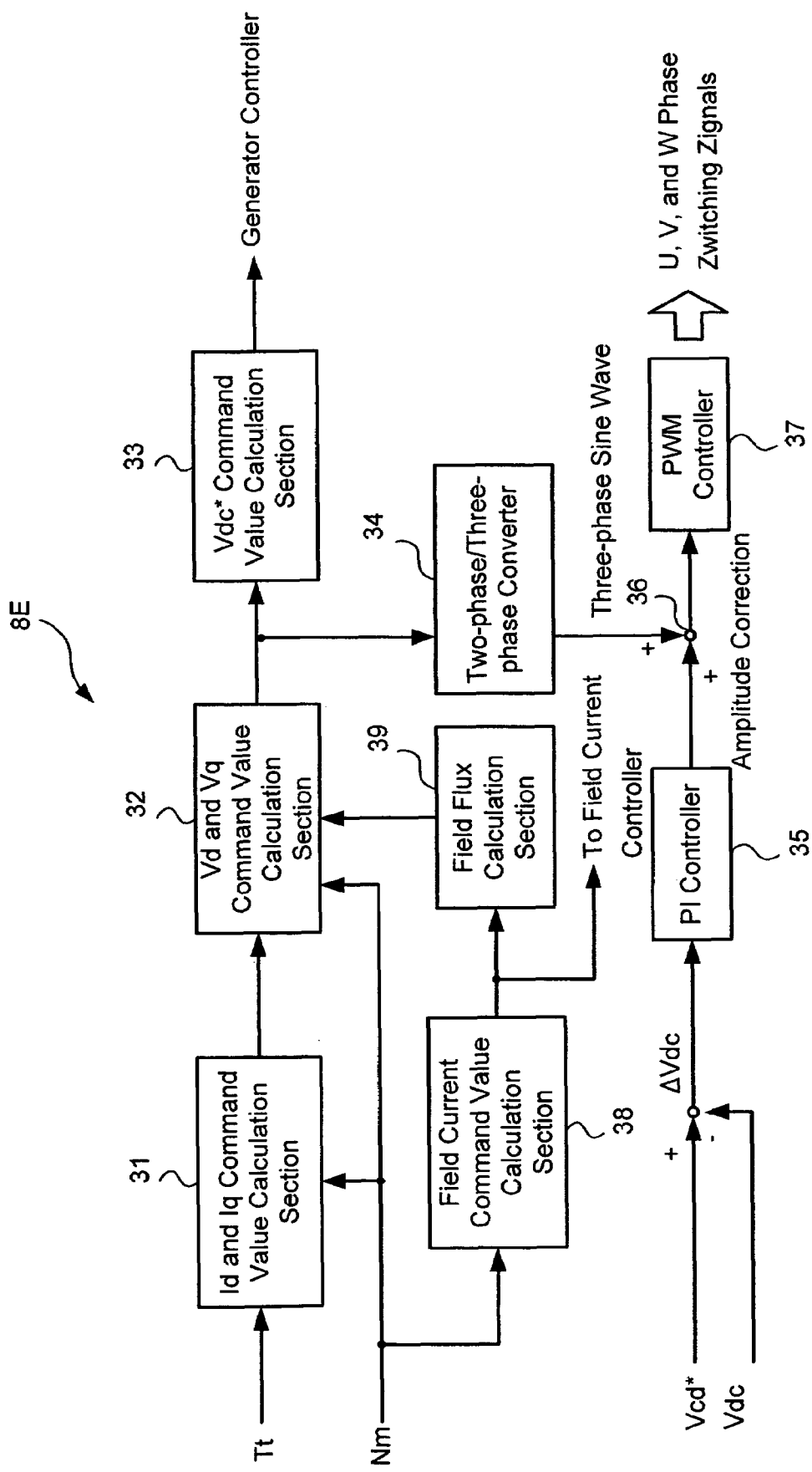
FIG. 7 is a block diagram illustrating one possible configuration of a motor controller in accordance with the first embodiment of the present invention.

FIG. 7 is a block diagram illustrating the details of the motor controller 8E that controls the motor 4 by the inverter 9. The motor controller 8E comprises an Id and Iq command value calculation section 31, a Vd and Vq command value calculation section 32, a Vdc* command value calculation section 33, a two-phase/three-phase converter 34, a PI controller 35, an amplitude corrector 36, a PWM controller 37, a field current command value calculation section 38, and a field flux calculation section 39. The motor controller 8E is configured to switch-control a three-phase power element of the inverter 9 so that the torque command value Tt is inputted and the actual motor torque T becomes (substantially equals) the torque command value Tt.

The Id and Iq command value calculation section 31 is configured to calculate command values Idr and Iqr with d axis (magnetic flux component) current and q axis (torque component) current for outputting torque that matches the torque command value Tt based on this torque command value Tt and the motor speed Nm. The Id and Iq command value calculation section 31 is configured to output these values to the Vd and Vq command value calculation section 32.

The Vd and Vq command value calculation section 32 is configured to calculate a d axis voltage command value Vdr for converting a d axis current value Id into a d axis current command value Idr, and a q axis voltage command value Vqr for converting a q axis current value Iq into a q axis current command value Iqr, based on the current command values Idr and Iqr inputted from the Id and Iq command value calculation section 31, the motor speed Nm, and the motor parameters (impedance and field flux) inputted from the field flux calculation section 39 (discussed below).

The Vdc* command value calculation section 33 is configured to calculate the generated voltage command value Vdc* based on the voltage command values Vdr and Vqr calculated by the Vd and Vq command value calculation section 32. The Vdc* command value calculation section 33 is configured to output these values to the above-mentioned generator controller 8D (FIG. 5).

The two-phase/three-phase converter 34 converts the d and q axis voltage command values Vdr and Vqr into a U phase voltage command value Vur, a V phase voltage command value Vvr, and a W phase voltage command value Vwr of a three-phase coordinate system, which are three-phase sine wave command values, and outputs these values to the amplitude corrector 36 (discussed below).

The PI controller 35 is configured to perform PI control, using as the input the deviation ΔVdc between the generated voltage command value Vdc* calculated by the Vdc* command value calculation section 33 and the actual generated voltage value Vdc, and outputs this result to the amplitude corrector 36. The description here is of subjecting ΔVdc to PI control, but the present invention is not limited to this, and any compensation method that stabilizes the system can be used.

The amplitude corrector 36 is configured to correct the amplitude of the three-phase sine wave command values outputted from the two-phase/three-phase converter 34, and the PWM controller 37 calculates PWM commands by comparing the corrected three-phase sine wave command values with triangular waves, and produces switching signals that are outputted to the inverter 9. The inverter 9 produces PWM wave voltage corresponding to these switching signals and applies this voltage to the motor 4. The motor 4 is driven by this voltage.

In the above amplitude correction, the PWM pulse width is reduced by comparing the generated voltage command value Vdc* with the actual generated voltage value Vdc and reducing the amplitude when Vdc*>Vdc. As a result, the impedance is higher and the voltage can be raised. Conversely, the PWM pulse width is increased by increasing the amplitude when Vdc*<Vdc. As a result, the impedance is lower and the voltage can be lowered.

The field current command value calculation section 38 is configured to calculate the field current command values based on the motor speed Nm, and outputs them to the field flux calculation section 39. The field flux calculation section 39 is configured to calculate the field flux and output the field flux to the Vd and Vq command value calculation section 32.

In FIG. 6, the PI controller 35 and the amplitude corrector 36 correspond to load varying section (pulse width varying section), and the PWM controller 37 corresponds to a PWM control section.

The operation of this embodiment will now be described.

Let us assume that the vehicle has been determined to be in a four-wheel-drive state, and the torque command value Tt has been calculated based on the wheel speed and the accelerator pedal depression amount (throttle valve opening amount). In this case, the generator controller 8D is configured to perform PI control on the deviation between the generated current command value Idc* calculated from the torque command value Tt and the actual generated current value Idc. The field current Ifg of the generator 7 is then controlled so that the actual generated current value Idc will conform to the generated current command value Idc*. The If line indicated by line A in the graph of the generator 7 characteristics in FIG. 6 is determined at this point.

The motor controller 8E calculates a three-phase sine wave command for the switching control of the three-phase power element of the inverter 9 based on the torque command value Tt and the motor speed Nm. The motor controller 8E then calculates a PWM command based on this three-phase sine wave command, and outputs this PWM command to the inverter 9. The deviation between the generated voltage command value Vdc* and the actual generated voltage value Vdc here is subjected to PI control, and the amplitude of the three-phase sine wave command is corrected.

If the actual generated voltage value Vdc is lower than the generated voltage command value Vdc*, the operating point will be at point b on the If line. In view of this, the impedance is changed and the operating point b is moved to the operating point a, which is most efficient for obtaining the motor torque.

In other words, when the state Vdc<Vdc* exists, the amplitude of the three-phase sine wave command is corrected lower. This results in a narrower PWM pulse width, the impedance of the inverter 9 is higher, and the actual generated voltage value Vdc is larger. This causes the operating point b to match the operating point a. This corresponds to determining the load line indicated by the one-dot chain line (the operating point which the generator 7 can attain when the inverter load is constant).

Therefore, the actual generated voltage value Vdc and the actual generated current value Idc conform to the generated voltage command value Vdc* and the generated current command value Idc*, allowing the motor 4 to be driven at the most efficient operating point.

Curves B1 to B4 in FIG. 6 are the paths of the operating point when the load of the generator 7 was gradually changed and the field voltage PWM duty ratio C1 was fixed in the self-excitation region of the generator 7. Curves B1 to B4 indicate the difference in the duty ratio C1.

Thus, with this embodiment, the actual generated current value is controlled so as to conform to the generated current command value based on the deviation between the actual generated current value and the generated current command value in generator control, and the load of the inverter is varied based on the deviation between the actual generated voltage value and the generated voltage command value in motor control, and the result of this control is that the actual generated voltage value conforms to the generated voltage command value, so the proper power generation control can be performed, and torque can be taken off more efficiently.

Also, the load of the inverter is varied by varying the PWM pulse width supplied to the motor, so the actual generated voltage value can be made to conform to the generated voltage command value relatively easily.

In the above embodiment, the description was of varying the PWM pulse width by correcting the pulse width of a three-phase sine wave command value based on the deviation between the generated voltage command value and the actual generated voltage. However, the present invention is not limited to this method. The PWM pulse width can instead, for example, be varied by correcting a variable that contributes to the load of the inverter, such as the d and q axis current command values or the d and q axis voltage command values, based on the deviation between the generated voltage command value and the actual generated voltage.

Also, in the above embodiment, the generated current was made to conform to a target value in generator control, and the generated voltage was made to conform to a target value in motor control. However, the present invention is not limited to this method. The generated voltage can instead, for example, be made to conform to a target value in generator control, and the generated current made to conform to a target value in motor control.

Referring now to FIGS. 8-11, a second embodiment of the present invention will now be explained. As shown in FIG. 8, the 4WD controller 8 of this embodiment, basically comprises the target motor torque calculation section 8A, the power calculation section 8B (serving as the motor power calculation section), the generator controller 8D, the motor controller 8E, the TCS controller 8F, and the clutch controller 8G. However, the motor controller 8E and the generator controller 8D have been modified as explained below. The target motor torque calculation section 8A, the motor controller 8E, the TCS controller 8F, and the clutch controller 8G are configured is the same manner as the first embodiment, unless otherwise indicated herein. With this embodiment of the present invention, the target output power to be outputted by the generator 7 is calculated from the power required by the AC motor 4, and the output power of the generator 7 is controlled to be the target output power, so motor torque can be controlled with a combination of the generator 7 and the AC motor 7, the effect of which is easier installation and improved 4WD performance.

The power calculation section 8B in FIG. 7 calculates the power Pm required by the motor 4 from the following Equation (7) based on the motor speed Nm and the torque command value Tt calculated by the target motor torque calculation section 8A.

$$Pm = Tt \times Nm \quad (7)$$

The motor controller 8E performs the known vector control shown in FIG. 5, using the torque command value Tt and the motor speed Nm. Three-phase alternating current is controlled by outputting the switching control signal of the three-phase power element to the inverter 9.

Figure 10:
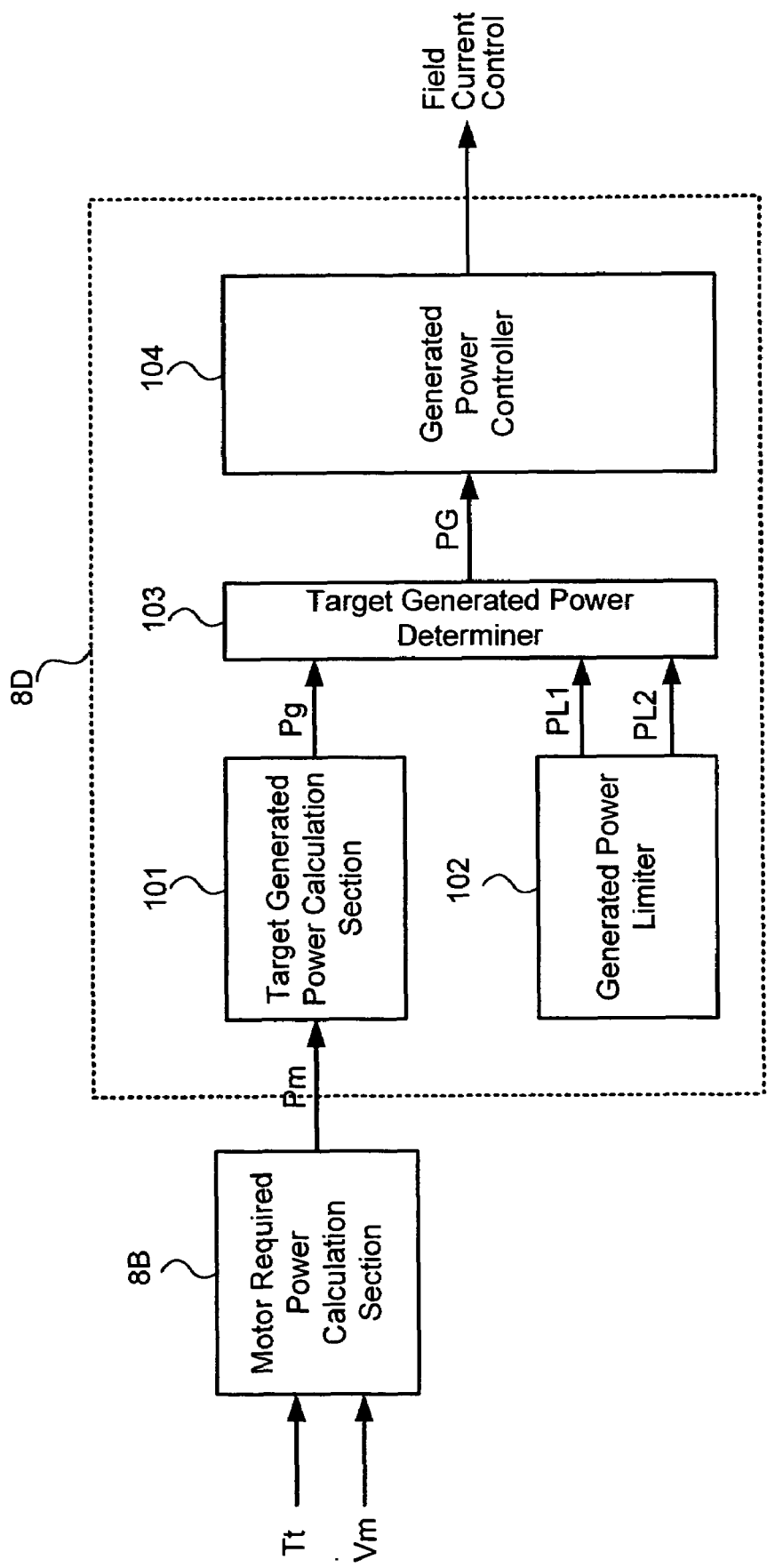
FIG. 10 is a block diagram illustrating one possible configuration of the generator controller in FIG. 8 in accordance with the second embodiment of the present invention.

FIG. 10 is a block diagram illustrating the details of the generator controller 8D that controls the power generated by the generator 7. This generator controller 8D comprises a target generated power calculation section 101, a generated power limiter 102, a target generated power determiner 103, and a generated power controller 104. The generator controller 8D is configured to control the field current Ifg of the generator 7.

The target generated power calculation section 101 calculates the generator required power Pgt to be outputted by the generator 7 from the following Equation (8) based on the motor required power Pm outputted from the power calculation section 8B.

$$Pgt = Pm / \eta m \quad (8)$$

Here, the term ηm is the motor efficiency. Specifically, the generator required power Pgt is a value that is outputted in an amount greater by the motor efficiency ηm than the motor required power Pm.

The generated power limiter 102 is configured to output generated power limits PL1 and PL2. The generated power limit PL1 is the upper limit which the generated power must not exceed. The generated power limit PL1 is determined according to the amount of torque that can be transmitted by the belt that drives the generator 7. This limit is calculated from the following Equation (9).

$$PL1 = Tb \times \omega g \times \eta g \quad (9)$$

Here, the term Tb is the torque that can be transmitted by the belt, the term ωg is the rotational speed of the generator 7, and the term ηg is the generator efficiency. Thus, the generated power limit PL1 corresponds to the maximum amount of power that can be generated by the generator 7 when the torque that can be transmitted by the belt is Tb.

The generated power limit PL2 is an upper limit set such that the generated power does not exceed a level at which engine overload could result in engine stress or diminished drivability. This generated power limit PL2 is given by the engine torque controller (ECM).

The calculation results of the target generated power calculation section 101 and the generated power limiter 102 are inputted to the target generated power determiner 103, and then the target output power PG of the generator 7 is calculated, with the generator required power Pg and the generated power limits PL1 and PL2 in a select-low mode.

This target output power PG is inputted to the generated power controller 104, and the generated power controller 104 controls the actual output power P so that the generator 7 outputs the target output power PG.

In FIG. 10, the processing of the target generated power calculation section 101, the generated power limiter 102, and the target generated power-determiner 103 corresponds to the target generated power calculation section (also known as a target output power calculation section), and the processing of the generated power controller 104 corresponds to the field current control section.

Figure 11:
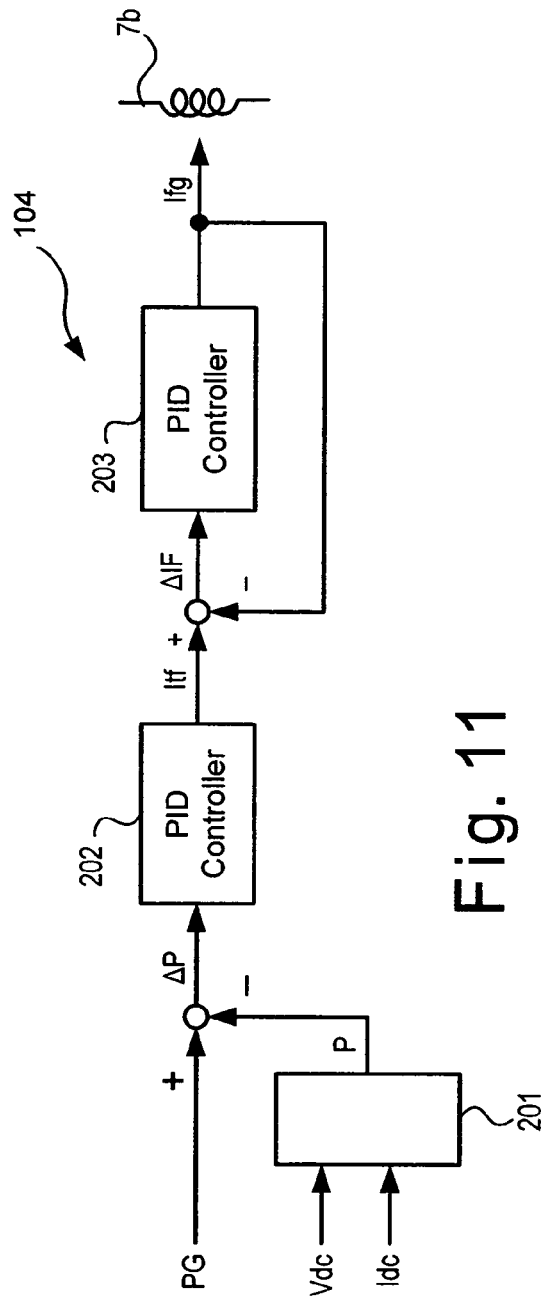
FIG. 11 is a block diagram illustrating one possible configuration of the generated power controller in accordance with the second embodiment of the present invention.

FIG. 11 is a block diagram of the generated power controller 104 in this second embodiment. The generated power controller 104 in this embodiment feeds back the generator field current value while monitoring the actual generator field current Ifg, so that the deviation between the target output power PG and the actual output power P will be zero.

First, the output voltage Vdc from the generator voltage sensor 14 and the output current Idc from the generator current sensor 15 are inputted to an actual power calculation section 201, and these values are multiplied to calculate the actual output power P (=Vdc×Idc).

The deviation ΔP between the actual output power P and the target output power PG is then inputted to a PID controller 202, and the PID controller 202 outputs a target field current Ift so that the deviation ΔP will be zero.

In this embodiment, the field current sensor 16 is provided as the field current sensing section, and this is used to sense the actual generator field current Ifg. The deviation ΔIf between the actual field current Ifg sensed by the field current sensor 16 and the target field current Ift is found and outputted to a PID controller 203. The PID controller 203 controls the actual field current Ifg so that the deviation ΔIf will be zero.

As a result, the actual output power P of the generator 7 matches the target output power PG. In FIG. 11, the processing of the actual power calculation section 201 corresponds to the output power calculation section, and the processing of the PID controllers 202 and 203 corresponds to the generator output control section.

Thus, in this second embodiment, the target output power to be outputted by the generator 7 is calculated from the power required by the motor 4, and the field current of the generator 7 is controlled so that the actual output power calculated from the output voltage and output current of the generator 7 becomes the target output power, so the generator 7 can properly supply the power required by the motor 4, and the motor 4 can output the proper torque.

Furthermore, since the field current of the generator 7 is monitored and feedback is performed so that this actual field current conforms to the target field current, the generated power can be reliably made to conform to the target power.

Figure 12:
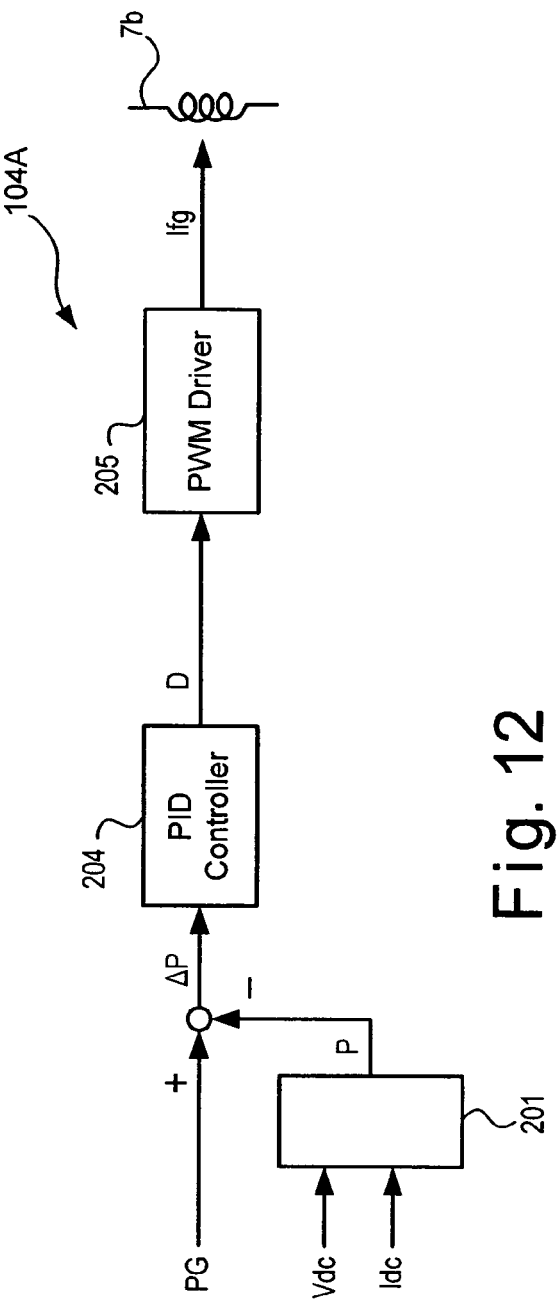
FIG. 12 is a block diagram illustrating one possible configuration of the generated power controller in accordance with a third embodiment of the present invention of the present invention.
Figure 13:
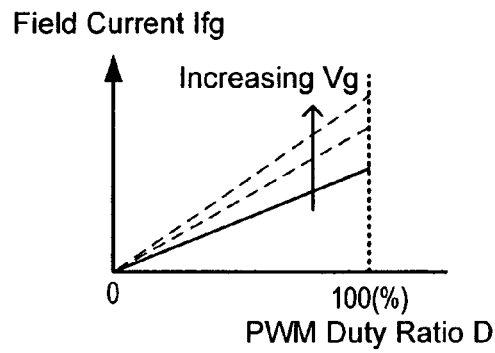
FIG. 13 is a graph of the relation between the field current and the PWM duty ratio in accordance with the third embodiment of the present invention of the present invention.
Figure 14:
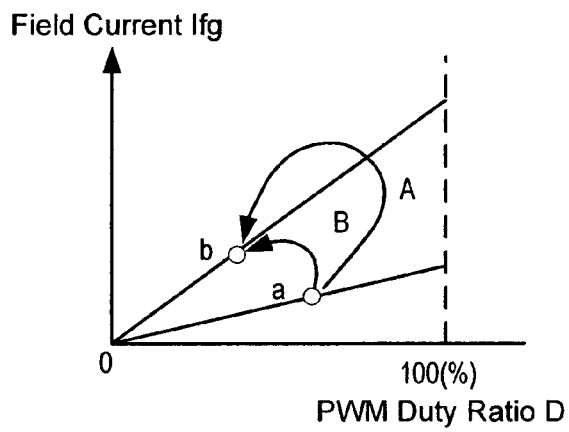
FIG. 14 is a diagram illustrating the state transition in accordance with the third embodiment of the present invention of the present invention.

Referring now to FIGS. 12-14, a third embodiment of the present invention will now be explained. This third embodiment is the same as the second embodiment above, but the field current of the generator 7 is subjected to PWM control, and the deviation between the target output power and the actual output power is thereby brought to zero.

FIG. 12 is a block diagram of a generated power controller 104A in the third embodiment. Just as in the second embodiment, the actual power calculation section 201 calculates the actual output power P, and the deviation ΔP between this actual output power P and the target output power PG is outputted to a PID controller 204. The PID controller 204 controls the PWM duty ratio D of the field current drive circuit of the generator 7 according to the deviation ΔP. More specifically, it increases the PWM duty ratio D when PG is greater than P, and decreases the PWM duty ratio D when PG is less than P.

For example, the following PID control is carried out.

$$D = \alpha \times (PG-P) + \beta \times \int (PG-P) \quad (10)$$

FIG. 13 is a graph of the relation between the field current Ifg and the PWM duty ratio D, in which the horizontal axis is the PWM duty ratio D and the vertical axis is the field current Ifg. As shown in this graph, there is no flow of field current Ifg when the duty ratio D is 0%, and the field current Ifg increases in flow as the duty ratio D approaches 100%.

These characteristics are such that the larger is the field power supply voltage Vf, the greater is the slope, and the smaller is the resistance of the field coil, the greater is the slope. This is expressed by Ifg=a×D when the generator output voltage Vg is less than or equal to the battery voltage Vb, and as Ifg=a×Vf×D when Vg is greater than Vb. The term "a" here is a constant.

The field current Ifg can be controlled by controlling the outputted PWM duty ratio D with a PWM driver 205, and as a result, the actual output power P of the generator 7 can be controlled to the target output power PG.

In the processing in FIG. 12, the processing of the PID controller 204 and the PWM driver 205 corresponds to the duty ratio control section.

Thus, in the third embodiment, the field current of the generator 7 is subjected to PWM control, so all sources of error in field current control, such as voltage fluctuation in the field current or resistance fluctuation in the field coil, can be controlled with a large loop between the actual output power and the target output power, so there is no need to provide a field current sensor as in the second embodiment, which allows the cost to be reduced.

Nevertheless, although the third embodiment above is optimally configured in terms of lowering cost, there may be problems in terms of generator controllability. Specifically, when the generator voltage Vg is equal to or less than the battery voltage Vb, the PWM duty ratio D is substantially proportional to the field current Ifg, but when the generator voltage Vg is greater than the battery voltage Vb, the field power supply voltage Vf increases, so the field current Ifg is greater at a given duty ratio D. Put another way, when the generator voltage Vg is high, the PWM duty ratio D has to be lowered in order to generate the same field current Ifg as at a lower voltage.

With the third embodiment above, however, whether the PWM duty ratio D is increased or decreased is determined solely based on whether the actual output power P or the target output power PG is greater, and the size of the field power supply voltage Vf is not taken into account. Accordingly, as shown in FIG. 14, for instance, when there is a transition from one control point a at which Vg≦Vb to a control point b at which Vg>Vb, there is a state transition as indicated by the curve A, which is a problem in that generated power overshoot and output fluctuation occur.

Figure 15:
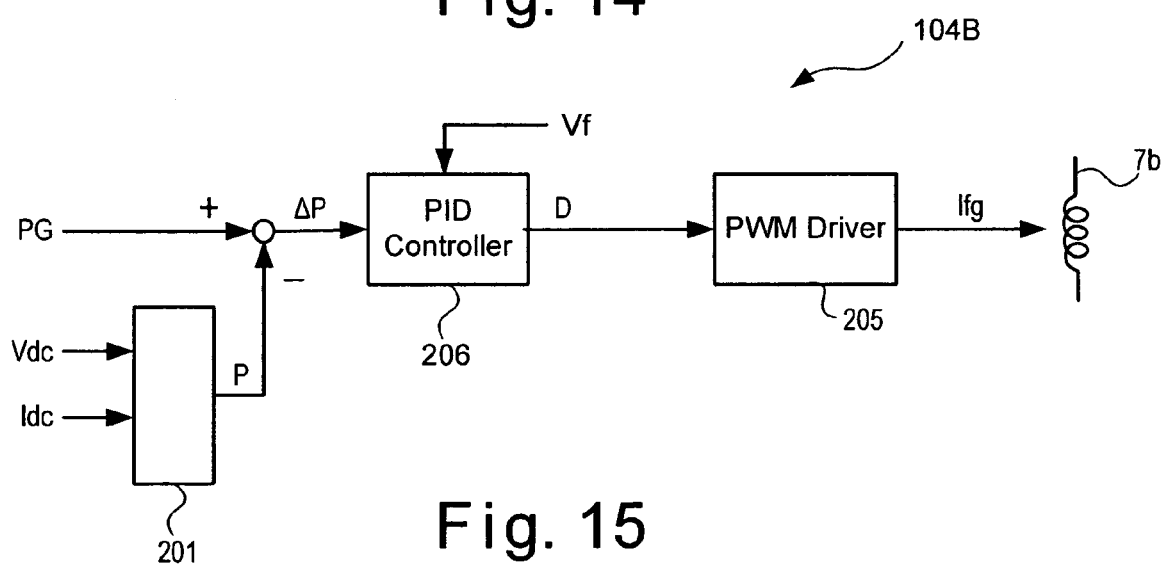
FIG. 15 is a block diagram illustrating one possible configuration of the generated power controller in accordance with a fourth embodiment of the present invention.
Figure 16:
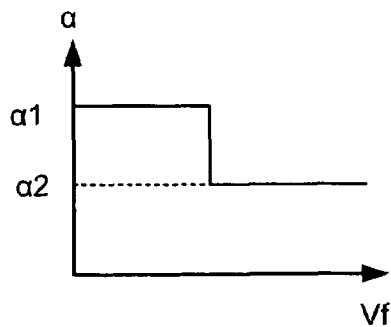
FIG. 16 is a graph of the α characteristics in the fourth embodiment of the present invention.
Figure 17:
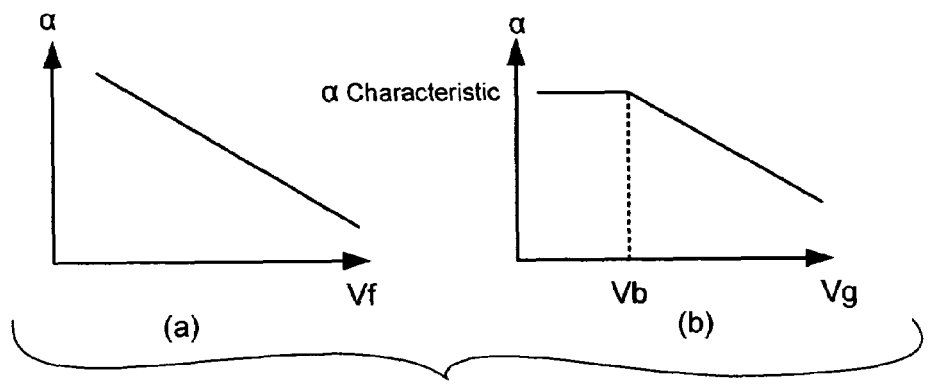
FIG. 17 is another example of a graph of the α characteristics in accordance with the fourth embodiment of the present invention.

Referring now to FIGS. 15-17, a fourth embodiment of the present invention will now be explained. In view of the drawbacks of the third embodiment, the fourth embodiment of the present invention adds an improvement that is aimed at the above drawbacks of the third embodiment. Thus, when there is a transition from control point a to control point b, there is a state transition as indicated by the curve B. This fourth embodiment is the same as the third embodiment above, but the weighting of the PWM duty ratio is changed according to the size of the field power supply voltage.

Specifically, as shown in FIG. 15, which is a block diagram of a generated power controller 104B in the fourth embodiment, the configuration is the same as that in FIG. 12, except that the PID controller 204 of the third embodiment is replaced by a PID controller 206 that varies the PWM duty ratio weighting according to the size of the field power supply voltage Vf, and outputs the PWM duty ratio D. Those components that have the same constitution are numbered the same and will not be described in detail again.

Just as in the third embodiment above, the PID controller 206 receives the input of the deviation ΔP between the actual output power P and the target output power PG, and outputs the PWM duty ratio D by performing the PID control expressed by Equation (10) above.

At this point, the a characteristics are varied according to the size of the field power supply voltage Vf. Specifically, the a characteristics are set in this embodiment as shown in FIG. 16, in which α is set to α1 when the field power supply voltage Vf is less than a specific value, and is set to α2, which is less than α1, when the field power supply voltage Vf is greater than or equal to the specific value.

As a result, when the generator voltage Vg is in a high region, the weighting of the PWM duty ratio D in feedback control can be set lower than when the voltage is low, and the PWM duty ratio D for generating the target field current can be properly controlled. Therefore, when there is a transition from control point a to control point b in FIG. 14, for example, it is possible to achieve the state transition indicated by curve B.

Thus, in the fourth embodiment above, the weighting of the PWM duty ratio is varied according to the size of the generator voltage, so when the generator voltage is high, the PWM duty ratio can be set lower than when the generator voltage is low, and favorable control can be performed without encountering the problem encountered with the third embodiment above, namely, the occurrence of generated power output overshoot and output fluctuation.

Furthermore, in the fourth embodiment above, the description was of varying the a characteristics according to the field power supply voltage Vf, but the present invention is not limited to this, and the α characteristics can instead be varied according to the generator voltage Vg.

Also, in the fourth embodiment above, the description was of setting the a characteristics as shown in FIG. 16, but the present invention is not limited to this. Specifically, because of the relationship of field current Ifg=a×Vf×D when Vg is greater than Vb, these characteristics can be set so that the greater is the generator voltage Vg, the smaller is the relative contribution of the PWM duty ratio D, as shown in diagram A of FIG. 17.

As shown in diagram B of FIG. 17, the settings can be such that when the generator voltage Vg is less than or equal to the battery voltage Vb, α is fixed at a specific value. However, when the generator voltage Vg exceeds the battery voltage Vb, α decreases in inverse proportion.

Furthermore, in the fourth embodiment above, the description was of varying only the α characteristics according to the size of the field power supply voltage, but the present invention is not limited to this, and the β characteristics can also be varied.

Figure 18:
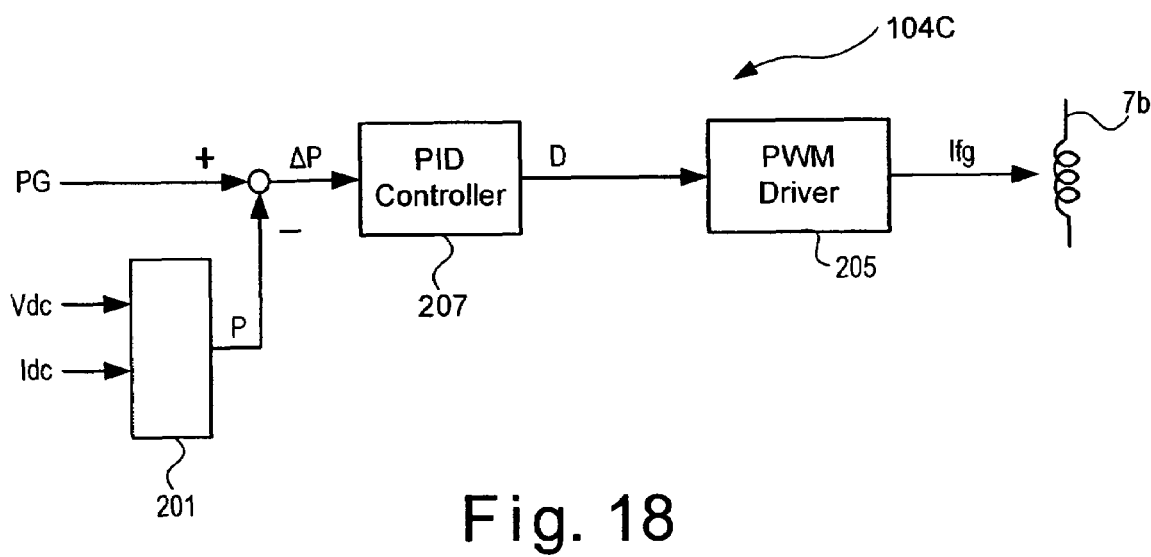
FIG. 18 is a block diagram illustrating one possible configuration of the generated power controller in accordance with a fifth embodiment of the present invention.

Referring now to FIG. 18, a fifth embodiment of the present invention will now be explained. This fifth embodiment is similar to the third embodiment discussed above, but this fifth embodiment involves multiplying the field power supply voltage by the PWM duty ratio and subjecting this product to feedback control.

Specifically, as shown in FIG. 18, which is a block diagram of a generated power controller 104C in the fifth embodiment, the configuration is the same as that in FIG. 12, except that the PID controller 204 of the third embodiment is replaced by a PID controller 207 subjects the product of the field power supply voltage Vf and the PWM duty ratio D (Vf×D) to feedback control, and outputs the PWM duty ratio D. Those components that have the same constitution are numbered the same and will not be described in detail again.

The PID controller 207 receives the input of the deviation ΔP between the actual output power P and the target output power PG, and outputs the PWM duty ratio D by performing the PID control expressed by the following Equation (11).

$$Vf \times D = \alpha \times (PG-P) + \beta \times \int (PG-P)$$

$$D = \{\alpha \times (PG-P) + \beta \times \int (PG-P)\}/Vf \quad (11)$$

As mentioned above, when the generator voltage Vg is greater than the battery voltage Vb, the field current Ifg=a× Vf×D, and from this relationship, (Vf×D) can be determined to be the field current Ifg and subjected to feedback control.

Thus, with the fifth embodiment above, the product of the field power supply voltage and the PWM duty ratio can be subjected to feedback control, so the resulting control effect is essentially that the field current is subjected to feedback control.

Also, when the field power supply voltage is high, the weighting of the PWM duty ratio can be set lower than when the voltage is low, without having to provide a variation map of α characteristics as in the fourth embodiment, making possible proper control that factors in the size of the field power supply voltage.

Referring now to FIGS. 19-22, a sixth embodiment of the present invention will now be explained. This sixth embodiment is similar to the second embodiment discussed above, but this sixth embodiment involves controlling the generated power from generated power characteristics in which the rotational speed of the generator is used as a parameter.

Figure 19:
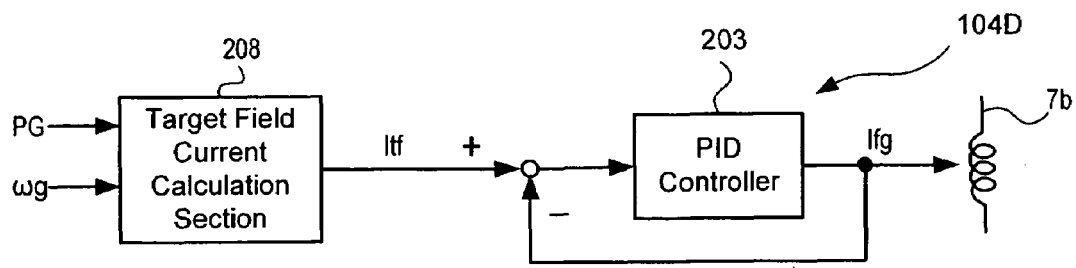
FIG. 19 is a block diagram illustrating one possible configuration of the generated power controller in accordance with a sixth embodiment of the present invention.

Specifically, as shown in FIG. 19, which is a block diagram of a generated power controller 104D in the sixth embodiment, the configuration is the same as that in FIG. 11, except that the actual power calculation section 201 used in the second embodiment and shown in FIG. 11 is eliminated, and the PID controller 202 is replaced with a target field current calculation section 208 that outputs the target field current Ift based on the rotational speed ωg of the generator 7 and the target output power PG. Those components that have the same constitution are numbered the same and will not be described in detail again.

Figure 20:
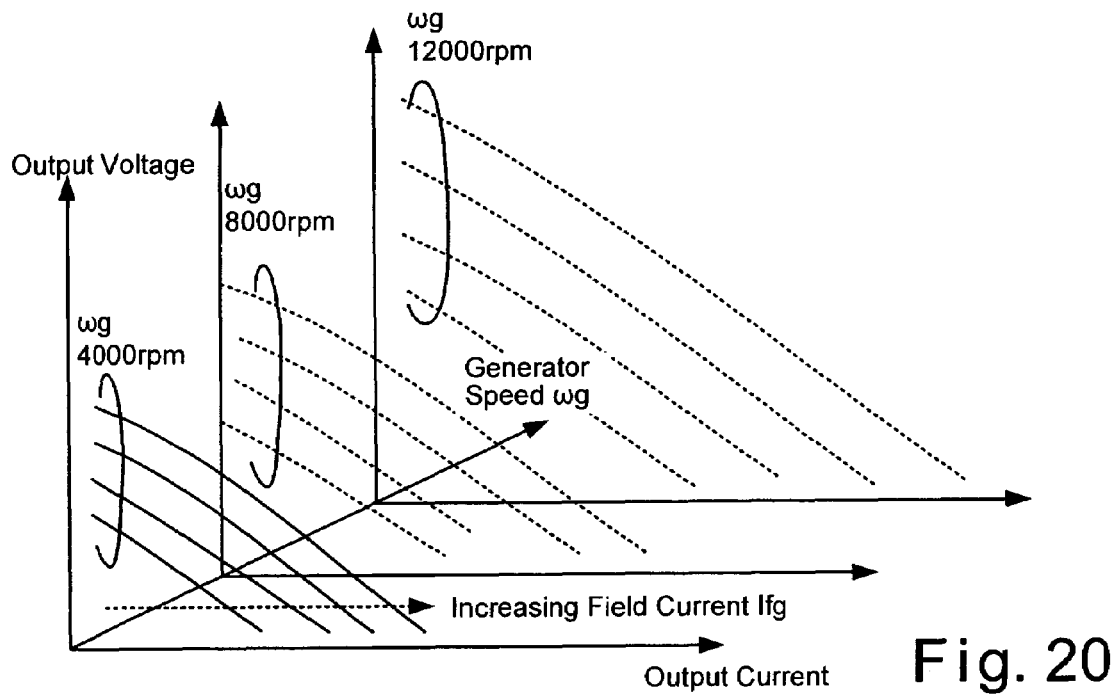
FIG. 20 is an output characteristic map for each generator speed in accordance with the sixth embodiment of the present invention.

The 4WD controller 8 has stored in it an output characteristic map for each of various speeds of the generator 7 as shown in FIG. 20, and the target field current calculation section 208 first searches the output characteristic map corresponding to the speed ωg of the generator 7.

This output characteristic map is a diagram of the current and voltage outputted by the generator 7 when the field current Ifg is constant at a specific speed ωg, with the horizontal axis being the output current and the vertical axis the output voltage. The speed settings are in fine increments (such as 100 rpm).

Figure 21:
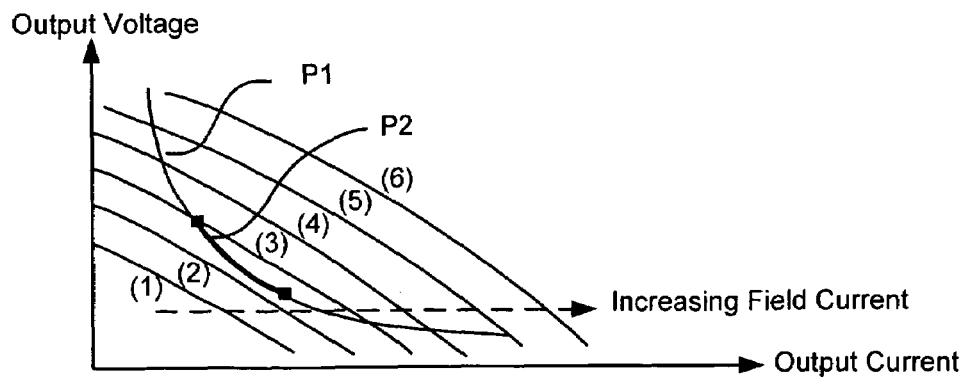
FIG. 21 is a diagram illustrating the target field current calculation method of the target field current calculation section in accordance with the sixth embodiment of the present invention.

When the output characteristic map is searched at the current speed ωg, as shown in FIG. 21, the field current value IfF at which the target output power PG can be supplied with some leeway is calculated according to a power line P1 determined by the target output power PG.

More specifically, a range P2 over which the target output power can be efficiently supplied is determined on the power line P1, and this is deemed to be the voltage and current range used for control. A characteristic (3) is selected that can cover this range with a certain amount of leeway. That is, what is selected is a field current value at which the voltage and current for efficiently outputting the target output power PG can be outputted with some leeway.

Next, the field current value IfF corresponding to this characteristic (3) is outputted as the target field current Ift. Characteristics (4) to (6), with which there is too much leeway, are unsuitable because there is the possibility that increased field current will waste power.

The actual output power P is controlled to the target output power PG by performing control such that the deviation between the target field current Ift thus selected and the actual field current Ifg sensed by the field current sensor becomes zero.

In the processing in FIG. 19, the processing of the target field current calculation section 208 corresponds to the target field current calculation section.

Thus, in the sixth embodiment, the field current of the generator 7 is controlled from generated power characteristics in which the rotational speed of the generator 7 is used as a parameter, so the proper power generation control can be performed to supply the required power to the motor 4.

Also, a field current that allows the power of the generator 7 to be outputted efficiently is selected from the generated power characteristics, and this effectively prevents situations such as a field current that is so low that torque cannot be obtained, or a field current that is so high that power is wasted.

Figure 22:
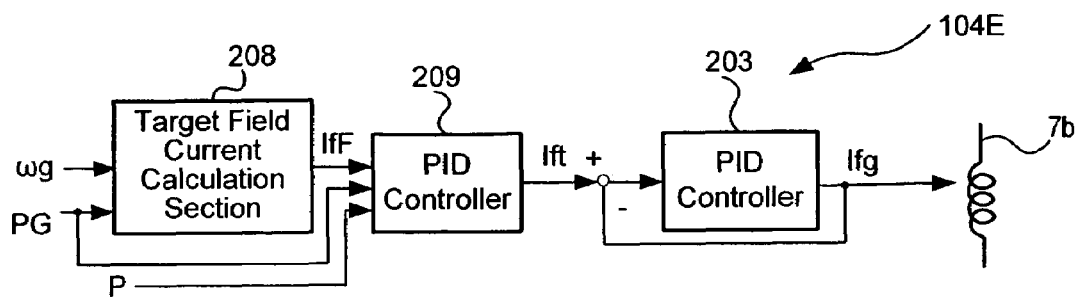
FIG. 22 is a block diagram illustrating a modified configuration of the generated power controller of FIG. 19 in accordance with the sixth embodiment of the present invention.

In the sixth embodiment above, the description was of outputting the field current value IfF calculated by the target field current calculation section 208 directly as the target field current Ift, but the present invention is not limited to this method. Rather, changes in characteristics due to temperature fluctuation or variance in generator characteristics, for example, can be taken into account. As shown in FIG. 22, a modified generated power controller 104E can be provided in which the field current value IfF calculated by the target field current calculation section 208 can be used as a feed-forward category and corrected by using the deviation between the actual output power P and the target output power PG. In this case, a PID controller 209 is provided after the target field current calculation section 208, and this PID controller 209 performs the feedback control indicated by the following Equation (12), and outputs the target field current Ift.

$$Ift = IfF + A \times (PG - P) + B \times \int (PG - P) \quad (12)$$

Here, the actual output power P is found just as in the first to fourth embodiments above, by multiplying the generator voltage sensor value by the generator current sensor value.

Figure 23:
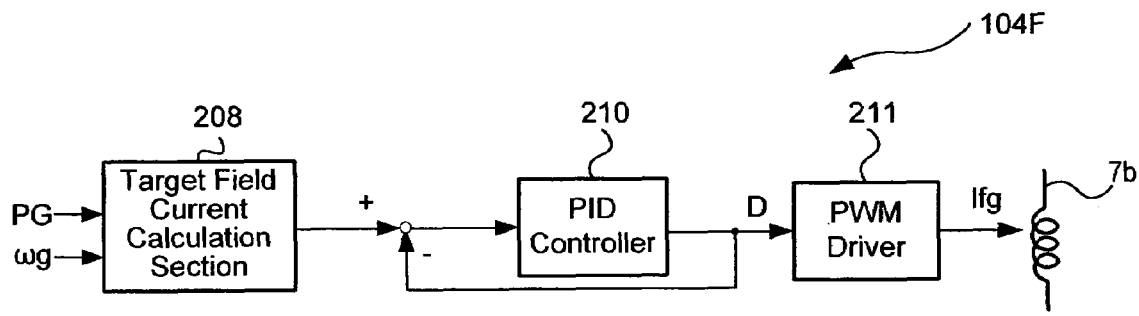
FIG. 23 is a block diagram illustrating one possible configuration of the generated power controller in accordance with a seventh embodiment of the present invention.
Figure 24:
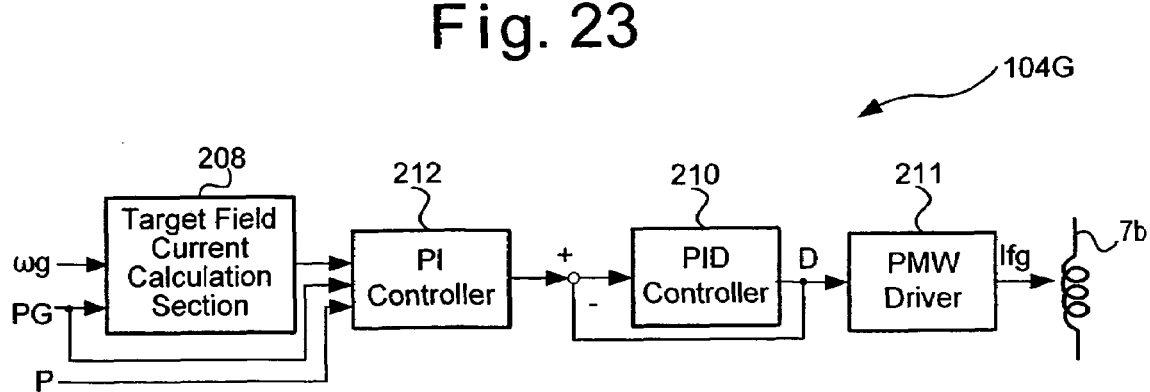
FIG. 24 is a block diagram illustrating a modified configuration of the generated power controller of FIG. 23 in accordance with the seventh embodiment of the present invention.

Referring now to FIGS. 23 and 24, a seventh embodiment of the present invention will now be explained. This seventh embodiment is similar to the sixth embodiment above, but the field current of the generator is subjected to PWM control.

FIG. 23 is a block diagram of a generated power controller 104F in the seventh embodiment. First, just as in the sixth embodiment above, the target field current calculation section 208 calculates the target field current Ift, and the deviation ΔIft between this target field current Ift and a field current converted value is outputted to a PID controller 210. The PID controller 210 outputs a PWM duty ratio D such that this deviation ΔIft will become zero.

Since the field current here is expressed as Ifg=a×Vf×D, as mentioned above, the target field current Ift is expressed as Ift=a×Vf×Dt, where Dt is the target PWM duty ratio. Therefore, it is possible to obtain a control effect whereby the field current is essentially subjected to feedback control, by performing feedback control using a field current converted value in which (Vf×D) is deemed to be the field current.

A PWM driver 211 controls the field current Ifg by controlling the PWM duty ratio D thus outputted.

Thus, in the seventh embodiment above, the field current can be subjected to feedback control without providing a field current sensor as in the sixth embodiment, which reduces the cost entailed.

In the seventh embodiment above, the description was of outputting the field current value IfF calculated by the target field current calculation section 208 directly as the target field current Ift, but the present invention is not limited to this, and changes in characteristics due to temperature fluctuation or variance in generator characteristics, for example, can be taken into account. As shown in FIG. 24, a modified generated power controller 104G can be provided in which the field current value IfF calculated by the target field current calculation section 208 can be used as a feed-forward category and corrected by using the deviation between the actual output power P and the target output power PG.

In this case, a PID controller 212 is provided after the target field current calculation section 208, and this PID controller 212 performs the PI control indicated by the following Equation (13), and outputs the target field current Ift.

$$Ift = IfF + A \times (PG - P) + B \times \int (PG - P) \quad (13)$$

Here, the actual output power P is found just as in the second to fifth embodiments above, by multiplying the generator voltage sensor value by the generator current sensor value.

Figure 25:
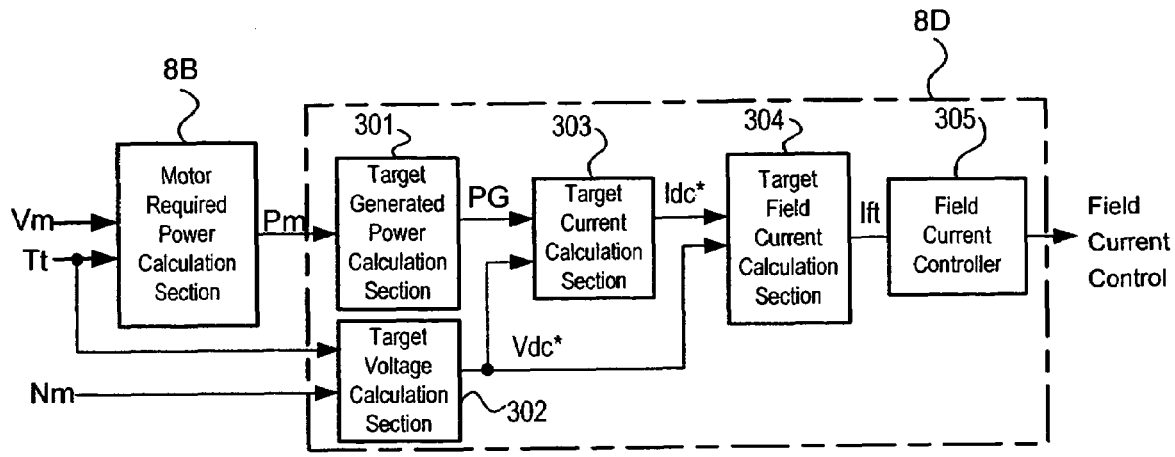
FIG. 25 is a block diagram illustrating one possible configuration of the generated power controller in accordance with an eighth embodiment of the present invention of the present invention.
Figure 26:
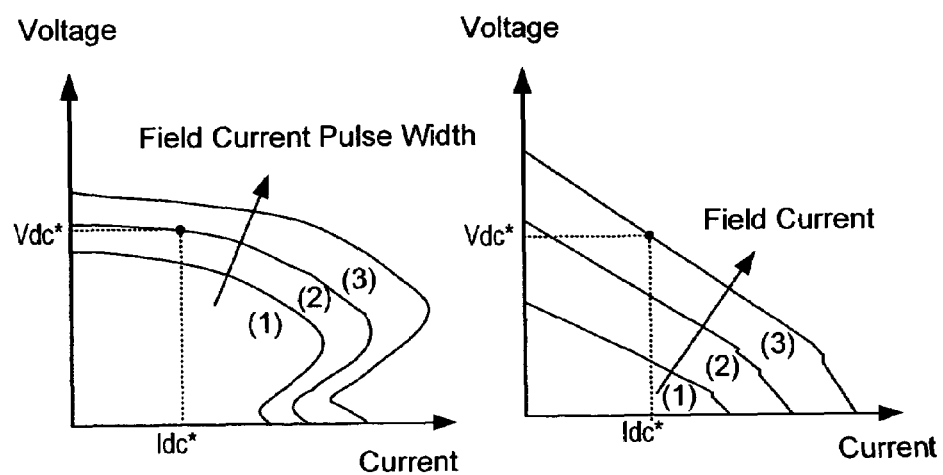
FIG. 26 is a diagram illustrating the target field current calculation method of the target field current calculation section in accordance with the eighth embodiment of the present invention.

Referring now to FIGS. 25 and 26, an eighth embodiment of the present invention will now be explained. This eighth embodiment is similar to the first embodiment in that involves controlling the magnetic field of the generator 7 based on the target voltage and target current required by the motor 4.

Specifically, as shown in FIG. 25, which shows the details of the generator controller 8D in the eighth embodiment, the generator controller 8D comprises a target generated power calculation section 301, a target voltage calculation section 302, a target current calculation section 303, a target field current calculation section 304, and a field current controller 305, uses a map to calculate the target field current Ift of the generator 7 based on the target voltage and target current required by the motor 4, and performs control so that the actual field current Ifg becomes this target field current Ift.

The target generated power calculation section 301 calculates the target output power PG to be outputted by the generator 7 from the following Equation (14) based on the motor required power Pm outputted from the power calculation section 8B discussed above.

$$PG = Pm / \eta m \quad (14)$$

The target voltage calculation section 302 refers to a pre-stored map and calculates the target output voltage Vdc* required by the motor based on the torque command value Tt and the motor speed Nm.

The target current calculation section 303 calculates the current required by the inverter 9, that is, the target current Idc* to be outputted by the generator 7, for the following Equation (15) based on the target voltage Vdc* calculated by the target voltage calculation section 302 and the target output power PG calculated by the target generated power calculation section 301.

$$Idc* = PG / Vdc* \quad (15)$$

The target field current calculation section 304 outputs a control signal for controlling the field current Ifg so that the output voltage and output current of the generator 7 will be the target voltage Vdc* and the target current Idc*. More specifically, a generator characteristic map is used in which the output voltage, the output current, and the field current serve as parameters.

Graph A of FIG. 26 illustrates the self-excitation characteristics of the generator 7. In the case of self-excitation, the voltage generated by the generator 7 itself is used to make the field current flow, so a parameter of the generator characteristics is the duty ratio of the voltage applied to the field current drive circuit, rather than the field current itself. That is, these generator characteristics indicate the voltage and current outputted by the generator 7 when the pulse width of the drive circuit of the generator field current is constant.

Graph B of FIG. 26 illustrates the separate-excitation characteristics of the generator 7. In the case of separate-excitation, the field current is made to flow by applying field voltage from another power supply, so the field current itself is used as a parameter. That is, these generator characteristics indicate the voltage and current outputted by the generator 7 when the generator field current is constant.

In other words, when a self-excitation operation is performed, the self-excitation graph shown in graph A of FIG. 26 is referred to, and the characteristic (2) is selected based on the target voltage Vdc* and the target current Idc* so that the output voltage and the output current of the generator 7 will be the target voltage Vdc* and the target current Idc*. The PWM duty ratio D for controlling the field current Ifg is outputted based on the field drive pulse width corresponding to this characteristic (2).

When a separate-excitation operation is performed, the separate-excitation graph shown in graph B of FIG. 26 is referred to, and the characteristic (3) is selected based on the target voltage Vdc* and the target current Idc* so that the output voltage and the output current of the generator 7 will be the target voltage Vdc* and the target current Idc*. The field current corresponding to this characteristic (3) is outputted as the target field current Ift.

The field current controller 305 controls the actual field current Ifg based on the target field current Ift or the PWM duty ratio D outputted from the target field current calculation section 304. As a result, the generator 7 outputs voltage and current that match the target voltage Vdc* and the target current Idc*.

In FIG. 25, the processing of the target generated power calculation section 301 corresponds to the target generated power calculation section (also known as a target output power calculation section), the processing of the target voltage calculation section 302 corresponds to the voltage calculation section, and the processing of the target current calculation section 303 corresponds to the current calculation section.

Thus, in the eighth embodiment above, the magnetic field is controlled so that the generator 7 will generate the voltage and current required by the motor, so a good balance is struck between the power consumed by the motor and the power generated by the generator 7, system loss is suppressed, and the system can be operated at a favorable operating point.

Furthermore, in the eighth embodiment above, the description was of the target voltage calculation section 302 calculating the target voltage Vdc* by referring to a map based on the torque command value Tt and the motor speed Nm, but the present invention is not limited to this method. Rather, the target voltage Vdc* can be calculated from the vector sum of the d axis voltage command value Vdr and the q axis voltage command value Vqr calculated based on the torque command value Tt in vector control of the motor controller 8E.

Also, in the eighth embodiment above, the description was of the target generated power calculation section 301 calculating the target output power PG from Equation (13), but the present invention is not limited to this method. The generated power limits PL1 and PL2 can be provided for calculating the target output power PG as in the second to seventh embodiments above.

The operation of the above described embodiments of the present invention will now be described through reference to FIG. 27.

Figure 27:
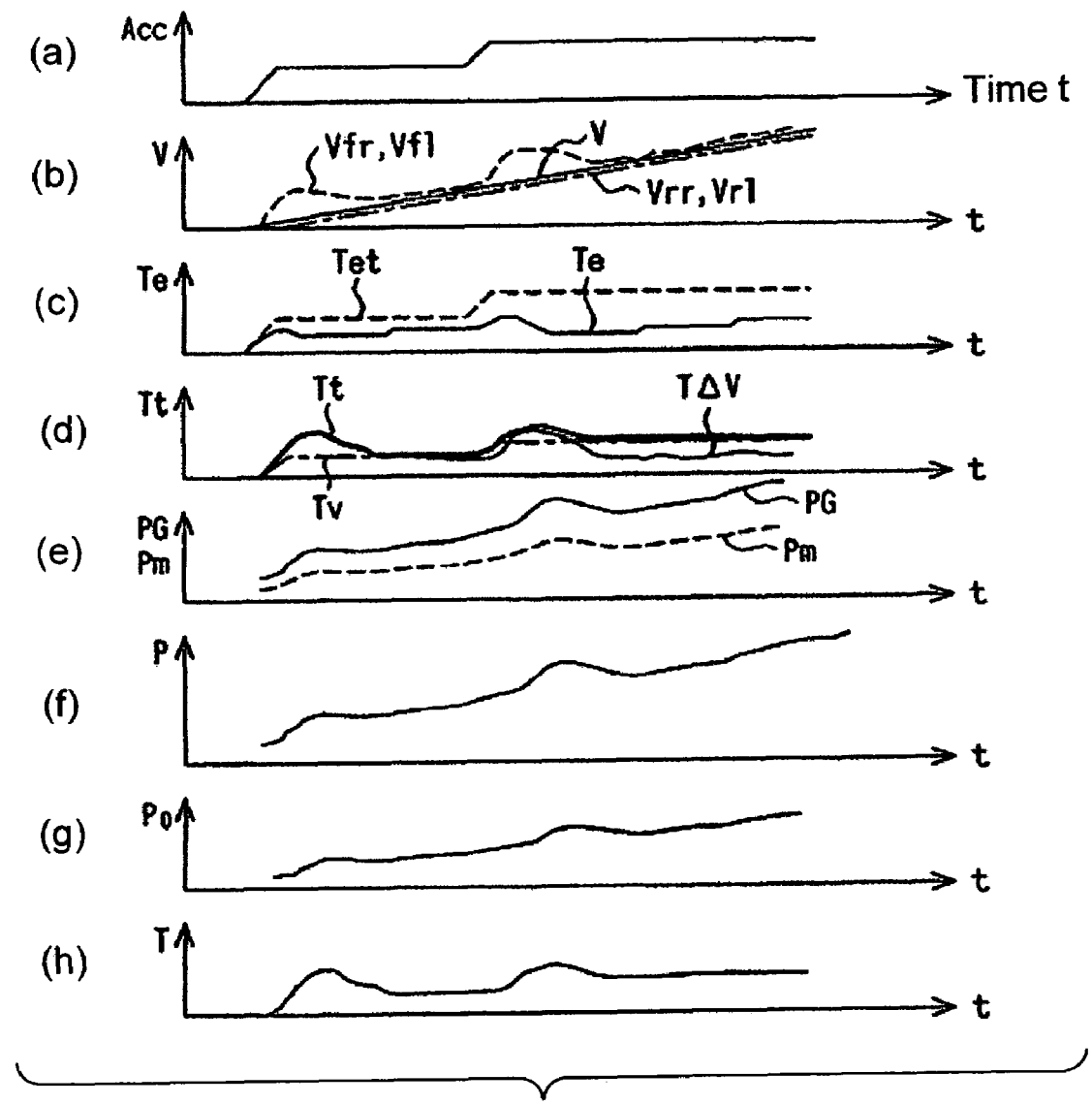
FIG. 27 is a diagram illustrating the operation of apparatus in accordance with the present invention.

In FIG. 27, graph (a) plots the accelerator opening, graph (b) plots a vehicle speed signal, graph (c) plots the engine command torque, graph (d) plots the torque command value Tt, and graph (e) plots the motor required power Pm and the target output power PG of the generator 7.

When the accelerator opening is varied as shown in graph (a) of FIG. 27, the front wheel speeds $V_{FR}$ and $V_{FL}$ change as indicated by the dashed line in graph (b) of FIG. 27, the rear wheel speeds $V_{RR}$ and $V_{RL}$ change as indicated by the one-dot chain line in graph (b) of FIG. 27, and as a result, the vehicle speed V changes as indicated by the solid line in graph (b) of FIG. 27.

The torque demand signal Tet, which the ECM determines from the accelerator opening or the like, is indicated by the dashed line in graph (c) of FIG. 27, and the torque demand signal Te, which is modulated by front wheel traction control of the TCS controller 8F, is indicated by the solid line in graph (c) of FIG. 27.

The thin line in graph (d) of FIG. 27 is the first motor drive force TΔV, and the one-dot chain line is the second motor drive force Tv. As shown in the detail block diagram of the target motor torque calculation section 8A in FIG. 10, the signal selected when the first motor drive force TΔV and the second motor drive force Tv are in select-high mode is the target torque Ttt, and if we assume from the relationship between the rear wheel speeds $V_{RR}$ and $V_{RL}$ and the vehicle speed V that rear wheel TCS control will not be performed, then Tt=Ttt, and this is indicated by the thick line in graph (d) of FIG. 27.

The power calculation section 8B calculates the motor required power Pm based on this torque command value Tt, and this is indicated by the dashed line in graph (e) of FIG. 27. The target generated power calculation section 101 in FIG. 10 calculates the generator required power Pg based on the motor required power Pm. At this point, if we assume that the power limits PL1 and PL2 outputted from the generated power limiter 102 are greater than the generator required power Pg, then the target output power PG of the generator 7 equals the generator required power Pg, and this is indicated by the solid line in graph (e) of FIG. 27.

The results shown in graphs (f) to (h) of FIG. 27 are obtained by performing magnetic field control of the generator in the first to seventh embodiments above based on the various signals that are outputted.

Graph (f) of FIG. 27 shows the actual output power P of the generator 7. It is clear from this drawing that the actual output power P matches the target output power PG indicated by the solid line in graph (e) of FIG. 27, which tells us that the power that the generator 7 is properly outputting the power it is supposed to output.

Graph (g) of FIG. 27 shows the output power Po of the motor 4. It is clear from this drawing that the output power Po of the motor 4 matches the motor required power Pm indicated by the dashed line in graph (e) of FIG. 27, which tells us that the generator is properly outputting the power required by the motor 4 in order for the motor torque T to match the torque command value Tt.

Further, graph (h) of FIG. 27 shows the motor torque T generated by the motor 4. It is clear from this drawing that the motor torque T matches the torque command value Tt indicated by the thick line in graph (d) of FIG. 27.

Thus, in the above described embodiments, by combining the generator 7 with the AC motor 4, proper motor torque control can be performed by using an inverter to convert the DC power supplied from the generator 7 through the rectifier into three-phase alternating current. The effect of this is that it is more advantageous than a conventional mechanical 4WD system in terms of fuel economy, the amount of passenger compartment space that is taken up, ease of installation, ease of platform sharing, and 4WD performance.

As used herein to describe the above embodiments, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A generated power control system for a hybrid vehicle having a generator configured to be driven by an internal combustion engine that drives a first wheel, and an AC motor that drives a second wheel not driven by the internal combustion engine with an inverter arranged to supply generated power from the generator to the AC motor, the generated power control system comprising:
   a motor power calculation section configured to calculate an AC motor power requirement of the AC motor;
   a target generated power calculation section configured to calculate a target generated power to be generated by the generator so that the target generated power matches the AC motor power requirement calculated by the motor power calculation section; and
   a magnetic field control section configured to control the generated power generated by the generator by controlling a magnetic field of the generator based on the target generated power calculated by the target generated power calculation section.

2. The generated power control system according to claim 1, further comprising
   a load varying section configured to vary a load on the inverter;
   a target generated voltage calculation section configured to calculate a target generated voltage to be outputted by the generator based on the target generated power calculated by the target generated power calculation section; and
   a target generated current calculation section configured to calculate a target generated current to be outputted by the generator based on the target generated power calculated by the target generated power calculation section,
   the magnetic field control section being further configured to control the magnetic field of the generator so that one of the target generated voltage and the target generated current serves as a target value to control the magnetic field of the generator, and
   the load varying section being further configured to vary the load on the inverter so that the other of the target generated voltage and the target generated current serves as a target value to vary the load on the inverter.

3. The generated power control system according to claim 2, further comprising
   a PWM control section configured to apply a PWM wave voltage to the AC motor by controlling the inverter, and the load varying section being a pulse width varying section that is configured to vary the load of the inverter by varying a pulse width of the PWM wave voltage.

4. The generated power control system according to claim 1, wherein
   the magnetic field control section includes an output power calculation section configured to calculate an actual output power of the generator from an output voltage and an output current of the generator, and a generator output control section configured to control the magnetic field of the generator so that the actual output power calculated by the output power calculation section substantially equals the target generated power.

5. The generated power control system according to claim 4, further comprising
   a field current sensing section configured to sense a field current of the generator, the generator output control section using the field current sensed by the field current sensing section to feedback control so that the actual output power substantially equals the target generated power.

6. The generated power control system according to claim 4, wherein
   the generator output control section includes a duty ratio control section configured to control a PWM duty ratio of a field current drive circuit of the generator so that the actual output power substantially equals the target generated power.

7. The generated power control system according to claim 6, wherein
   the duty ratio control section is further configured to set the PWM duty ratio based on a power supply voltage amount of the field current drive circuit.

8. The generated power control system according to claim 1, wherein
   magnetic field control section includes a target field current calculation section configured to calculate a target generator field current of the generator so that the generator will output power greater than the target generated power, based on generated power characteristics that at least includes a rotational speed of the generator as one parameter, and
   magnetic field control section is further configured to perform control such that a field current of the generator becomes the target generator field current calculated by the target field current calculation section.

9. The generated power control system according to claim 1, wherein
   magnetic field control section includes a target voltage calculation section configured to calculate a target voltage required by the AC motor, and a target current calculation section configured to calculate a target current required by the AC motor based on the target generated power and the target voltage, and
   the magnetic field control section is further configured to control the magnetic field of the generator so that a generator output voltage and a generator output current of the generator substantially equals the target voltage and the target current, respectively.

10. The generated power control system according to claim 9, wherein
    the target voltage calculation section is configured to calculate the target voltage based on a torque command value and a motor speed, and
    the target current calculation section is configured to calculate the target current by dividing the target generated power by the target voltage.

11. The generated power control system according to claim 1, wherein
    the magnetic field control section is configured to provide an upper limit to the target generated power by using a power limit value corresponding to an upper limit of torque that can be transmitted by a belt driving the generator.

12. The generated power control system according to claim 1, wherein
    the magnetic field control section is configured to provide an upper limit to the target generated power by using a power limit value that prevents a decrease in drivability due to an excessive load occurring on the internal combustion engine.

13. The generated power control system according to claim 1, further comprising
  a vehicle drive force calculation section configured to calculate a drive force required by the hybrid vehicle; and
  a motor drive force calculation section configured to calculate the drive force to be outputted by the AC motor based on the vehicle drive force calculated by the vehicle drive force calculation section,
  the motor power calculation section configured to calculate the motor power requirement of the AC motor based on the motor drive force calculated by the motor drive force calculation section.

14. The generated power control system according to claim 13, further comprising
  a load varying section configured to vary a load on the inverter;
  a target generated voltage calculation section configured to calculate a target generated voltage to be outputted by the generator based on the target generated power calculated by the target generated power calculation section; and
  a target generated current calculation section configured to calculate a target generated current to be outputted by the generator based on the target generated power calculated by the target generated power calculation section,
  the magnetic field control section being further configured to control the magnetic field of the generator so that one of the target generated voltage and the target generated current serves as a target value to control the magnetic field of the generator, and
  the load varying section being further configured to vary the load on the inverter so that the other of the target generated voltage and the target generated current serves as a target value to vary the load on the inverter.

15. The generated power control system according to claim 14, further comprising
  a PWM control section configured to apply a PWM wave voltage to the AC motor by controlling the inverter, and
  the load varying section being a pulse width varying section that is configured to vary the load of the inverter by varying a pulse width of the PWM wave voltage.

16. The generated power control system according to claim 13, wherein
  the magnetic field control section includes an output power calculation section configured to calculate an actual output power of the generator from an output voltage and an output current of the generator, and a generator output control section configured to control the magnetic field of the generator so that the actual output power calculated by the output power calculation section substantially equals the target generated power.

17. The generated power control system according to claim 16, further comprising
  a field current sensing section configured to sense a field current of the generator, the generator output control section using the field current sensed by the field current sensing section to feedback control so that the actual output power substantially equals the target generated power.

18. The generated power control system according to claim 16, wherein
  the generator output control section includes a duty ratio control section configured to control a PWM duty ratio of a field current drive circuit of the generator so that the actual output power substantially equals the target generated power.

19. The generated power control system according to claim 18, wherein
  the duty ratio control section is further configured to set the PWM duty ratio based on a power supply voltage amount of the field current drive circuit.

20. The generated power control system according to claim 13, wherein
  the magnetic field control section includes a target field current calculation section configured to calculate a target generator field current of the generator so that the generator will output power greater than the target generated power, based on generated power characteristics that at least includes a rotational speed of the generator as one parameter, and
  the magnetic field control section is further configured to perform control such that a field current of the generator becomes the target generator field current calculated by the target field current calculation section.

21. The generated power control system according to claim 13, wherein
  the magnetic field control section includes a target voltage calculation section configured to calculate a target voltage required by the AC motor, and a target current calculation section configured to calculate a target current required by the AC motor based on the target generated power and the target voltage, and
  the magnetic field control section is further configured to control the magnetic field of the generator so that a generator output voltage and a generator output current of the generator substantially equals the target voltage and the target current, respectively.

22. The generated power control system according to claim 21, wherein
  the target voltage calculation section is configured to calculate the target voltage based on a torque command value and a motor speed, and
  the target current calculation section is configured to calculate the target current by dividing the target generated power by the target voltage.

23. The generated power control system according to claim 13, wherein
  the magnetic field control section is configured to provide an upper limit to the target generated power by using a power limit value corresponding to an upper limit of torque that can be transmitted by a belt driving the generator.

24. The generated power control system according to claim 13, wherein
  the magnetic field control section is configured to provide an upper limit to the target generated power by using a power limit value that prevents a decrease in drivability due to an excessive load occurring on the internal combustion engine.

25. A generated power control system for a hybrid vehicle having a generator configured to be driven by an internal combustion engine that drives a first wheel and an AC motor that drives a second wheel not driven by the internal combustion engine with an inverter arranged to supply generated power from the generator to the AC motor, the generated power control system comprising:
  motor power calculation means for calculating an AC motor power requirement of the AC motor;
  target generated power calculation means for calculating a target generated power to be generated by the generator so that the target generated power matches the AC motor power requirement calculated by the motor power calculation means; and magnetic field control means for controlling the generated power generated by the generator by controlling a magnetic field of the generator based on the target generated power calculated by the target generated power calculation means.

26. A method of controlling generated power of a hybrid vehicle having a generator configured to be driven by an internal combustion engine that drives a first wheel and an AC motor that drives a second wheel not driven by the internal combustion engine with an inverter arranged to supply generated power from the generator to the AC motor, the method comprising:

calculating an AC motor power requirement of the AC motor;

calculating a target generated power to be generated by the generator so that the target generated power matches the AC motor power requirement that was calculated; and controlling a magnetic field of the generator based on the target generated power that was calculated.

* * * * *